(12) United States Patent
Nishio et al.

(10) Patent No.: US 9,513,469 B2
(45) Date of Patent: Dec. 6, 2016

(54) ZOOM LENS AND IMAGE PICKUP APPARATUS USING THE SAME

(71) Applicant: Olympus Corporation, Tokyo (JP)

(72) Inventors: Akinori Nishio, Tokyo (JP); Masahiro Imamura, Tokyo (JP)

(73) Assignee: Olympus Corporation, Tokyo (JP)

( * ) Notice: Subject to any disclaimer, the term of this patent is extended or adjusted under 35 U.S.C. 154(b) by 226 days.

(21) Appl. No.: 14/582,083

(22) Filed: Dec. 23, 2014

(65) Prior Publication Data

US 2015/0130970 A1 May 14, 2015

Related U.S. Application Data

(62) Division of application No. 13/747,194, filed on Jan. 22, 2013, now Pat. No. 8,953,252.

(30) Foreign Application Priority Data

Feb. 22, 2012 (JP) .................................. 2012-035705
Jun. 22, 2012 (JP) .................................. 2012-140444

(51) Int. Cl.
  *G02B 15/14* (2006.01)
  *G02B 13/00* (2006.01)
  *G02B 15/173* (2006.01)
  *H04N 5/232* (2006.01)

(52) U.S. Cl.
  CPC ............. *G02B 13/009* (2013.01); *G02B 15/14* (2013.01); *G02B 15/173* (2013.01); *H04N 5/23296* (2013.01)

(58) Field of Classification Search
None
See application file for complete search history.

(56) References Cited

U.S. PATENT DOCUMENTS

| | | | |
|---|---|---|---|
| 4,906,079 A | 3/1990 | Mihara et al. | |
| 5,247,393 A * | 9/1993 | Sugawara | G02B 15/173 359/676 |
| 7,088,521 B2 | 8/2006 | Hamano et al. | |
| 7,382,549 B2 | 6/2008 | Miyajima | |
| 7,692,870 B2 | 4/2010 | Ohtake | |
| 7,830,613 B2 | 11/2010 | Ichikawa | |
| 8,149,522 B2 | 4/2012 | Mihara | |
| 2007/0229975 A1 * | 10/2007 | Ito | G02B 15/173 359/689 |
| 2011/0285896 A1 | 11/2011 | Mihara | |

FOREIGN PATENT DOCUMENTS

| | | |
|---|---|---|
| JP | 2003-057544 | 2/2003 |
| JP | 2005257868 A * | 9/2005 |

(Continued)

*Primary Examiner* — Scott J Sugarman
*Assistant Examiner* — Gary O'Neill
(74) *Attorney, Agent, or Firm* — Andrews Kurth Kenyon LLP

(57) ABSTRACT

A zoom lens comprises a first lens unit G1 having a positive refractive power, a second lens unit G2 having a negative refractive power, and a plurality of lens units G3 and G4. Zooming from a wide angle end to a telephoto end is carried out by changing a distance between the lens units. One of the first lens unit G1 and the second lens unit G2 has, or both the first lens unit G1 and the second lens unit G2 have a specific arrangement.

16 Claims, 23 Drawing Sheets

(56) References Cited

FOREIGN PATENT DOCUMENTS

| | | |
|---|---|---|
| JP | 2005-316047 | 11/2005 |
| JP | 2006-171055 | 6/2006 |
| JP | 2009-047785 | 3/2009 |
| JP | 2010-091881 | 4/2010 |
| JP | 2010-164606 | 7/2010 |
| JP | 2011-247949 | 12/2011 |

* cited by examiner

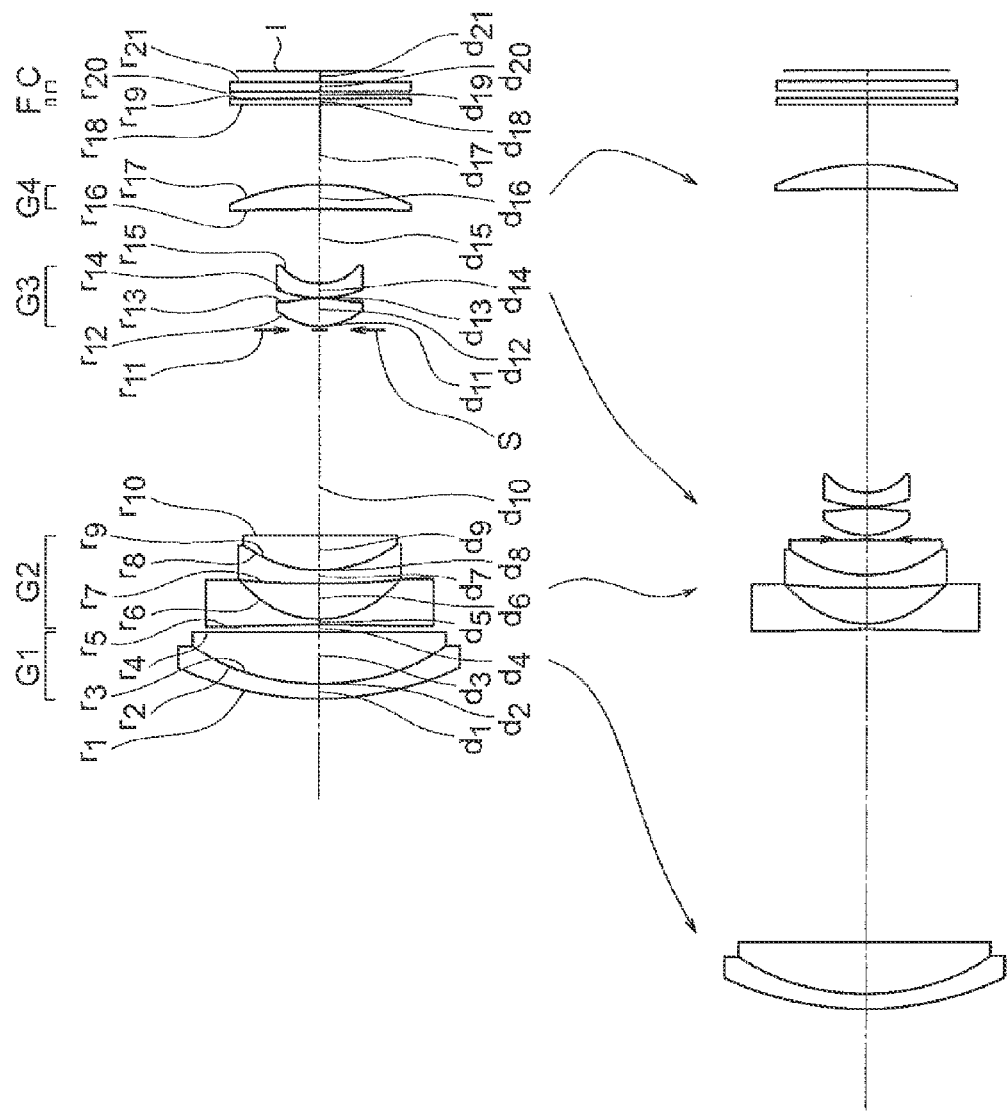

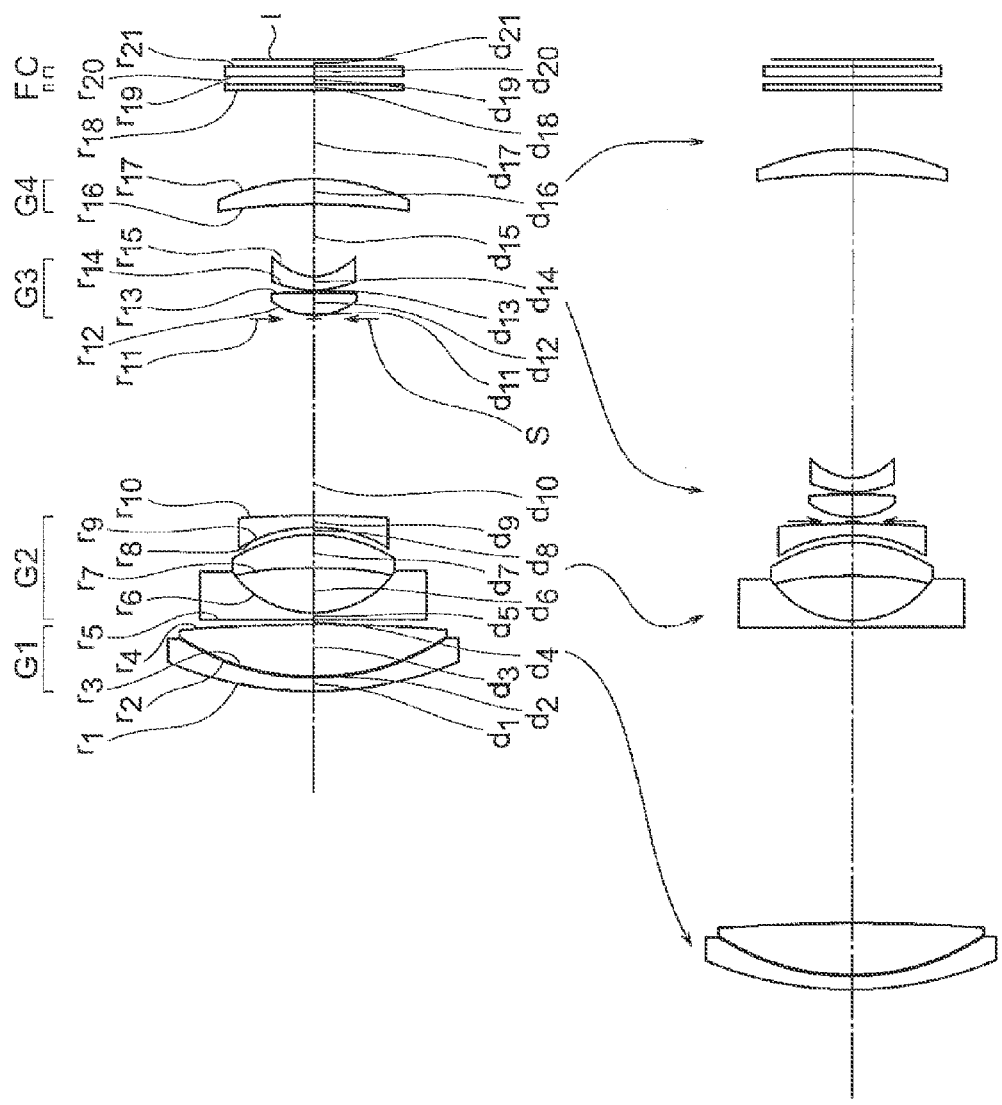

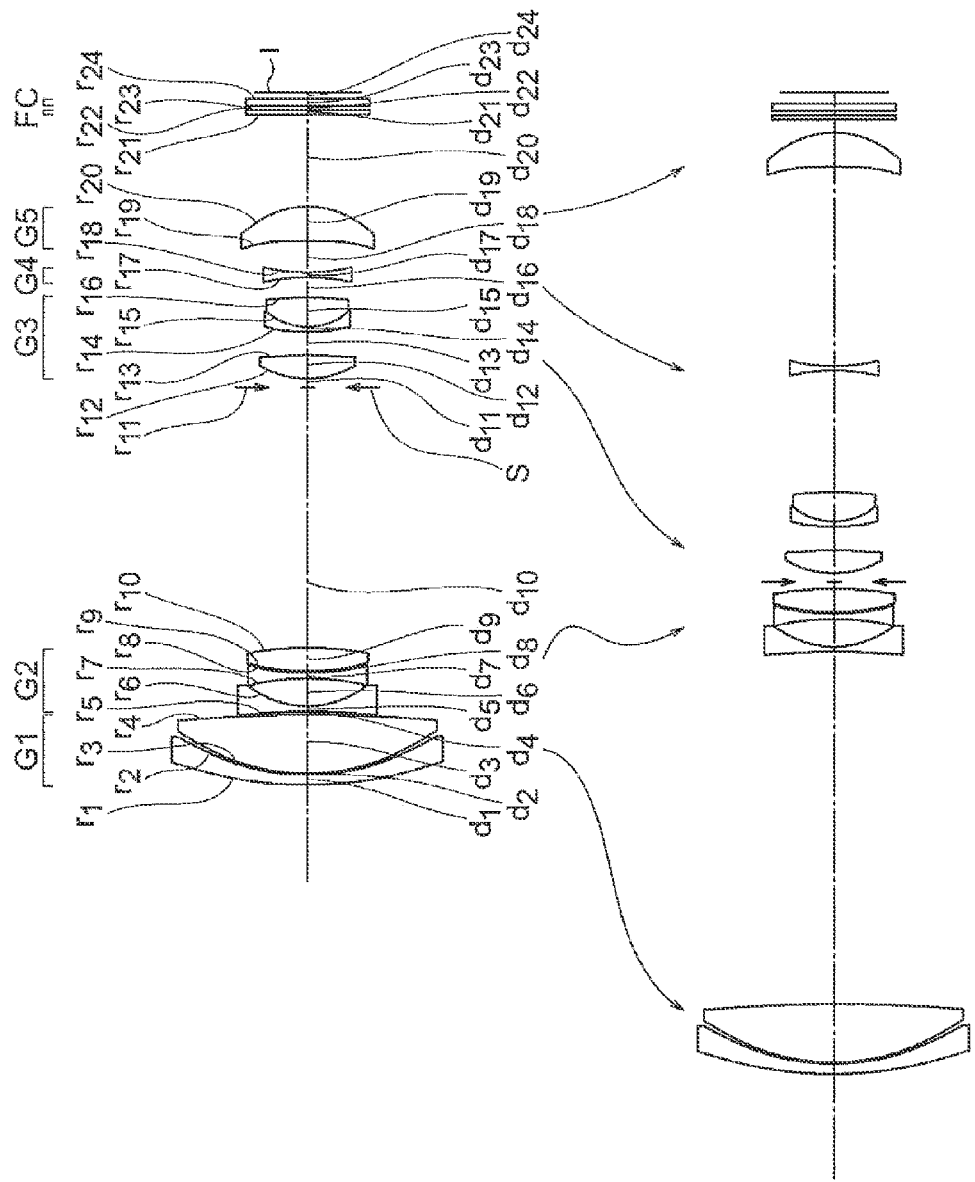

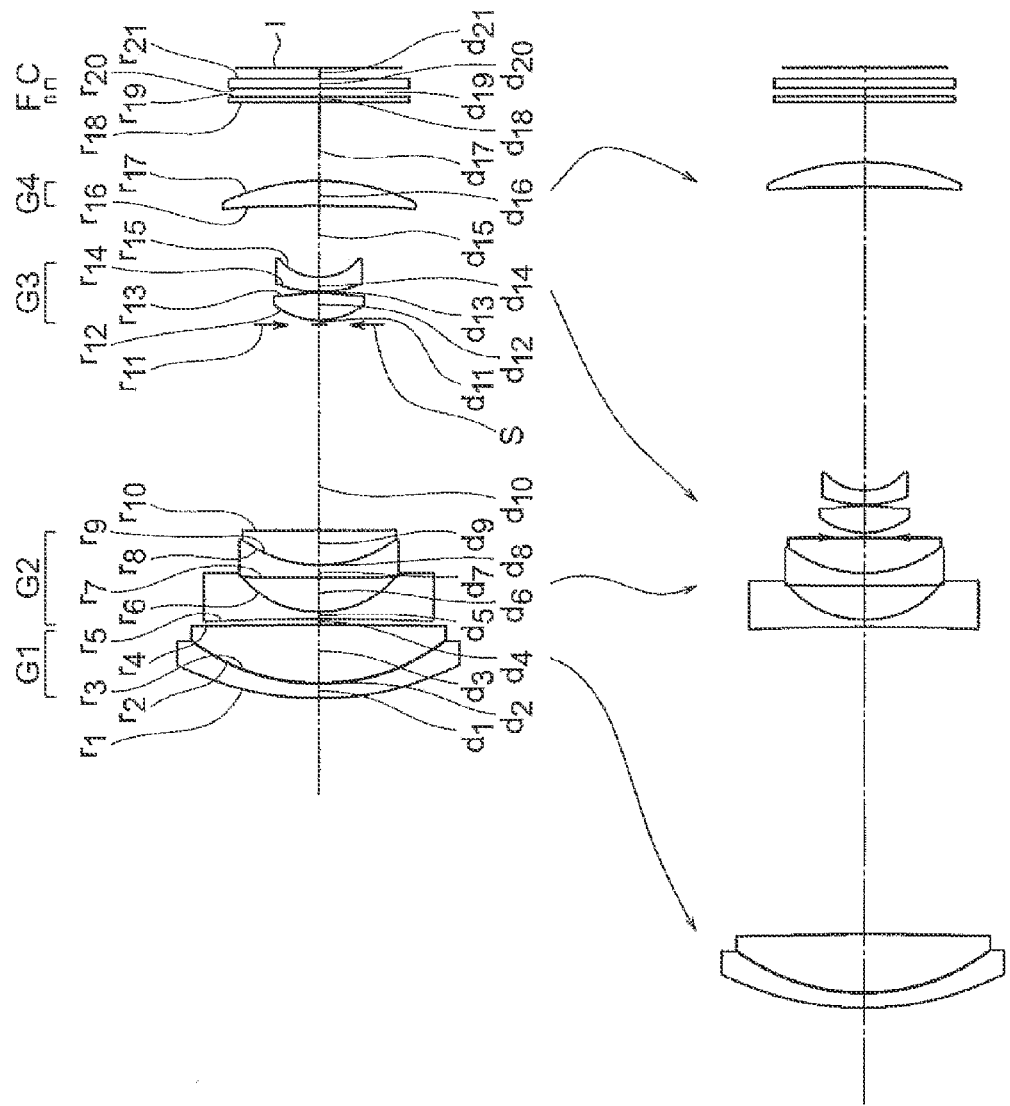

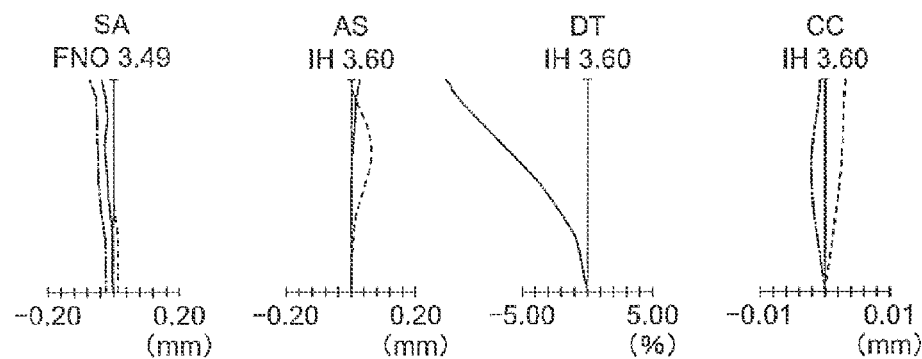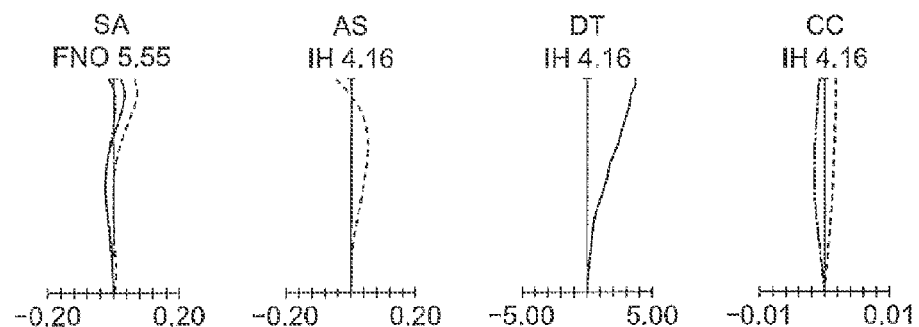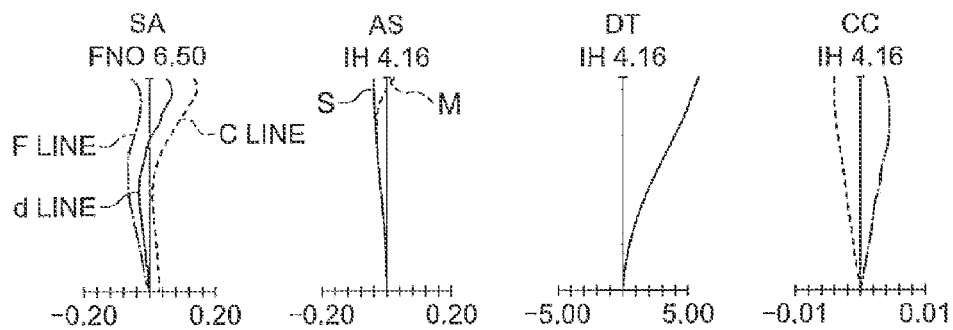

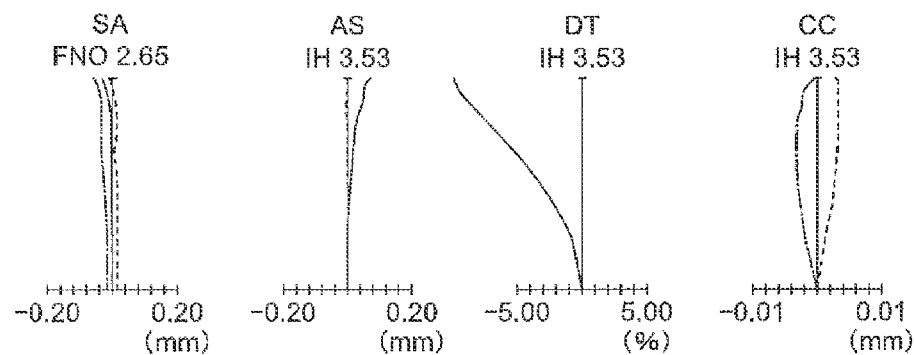
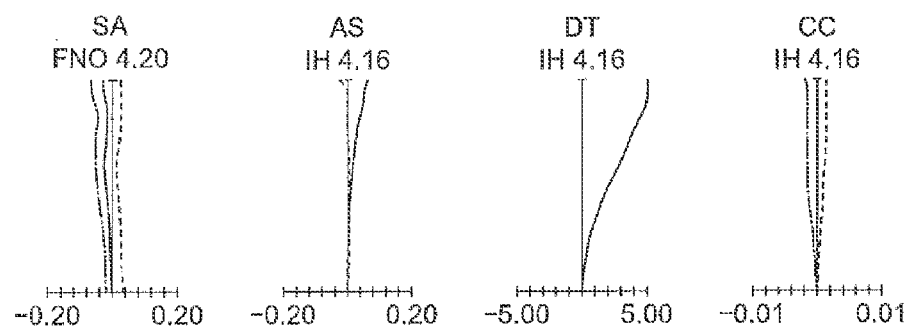
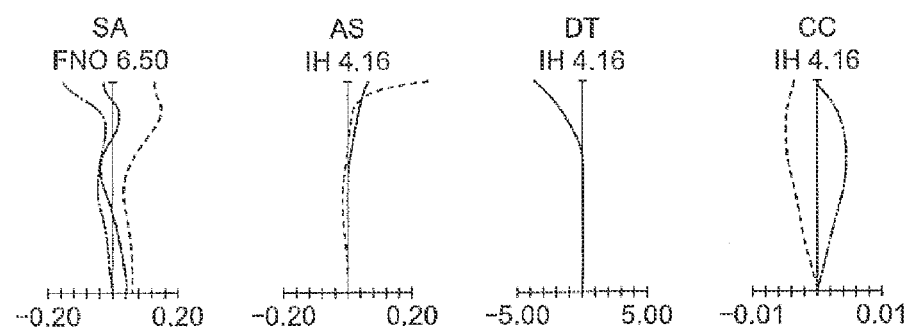

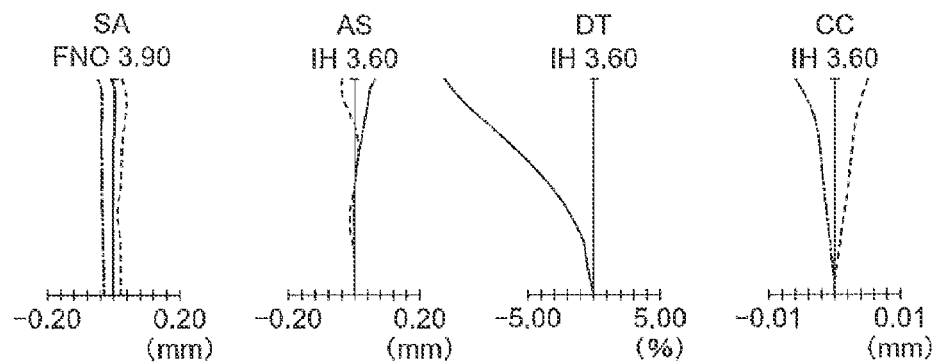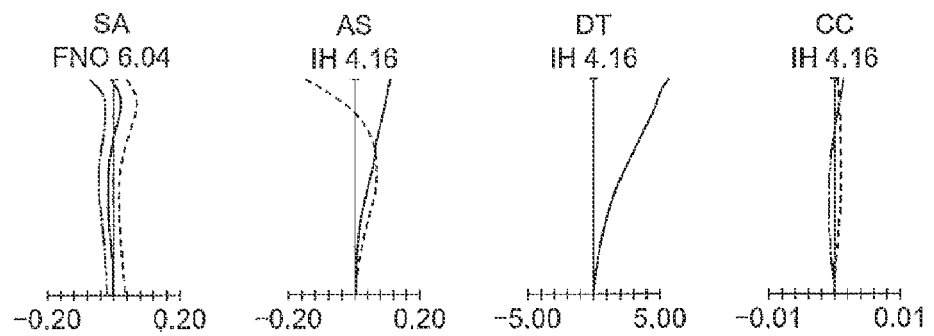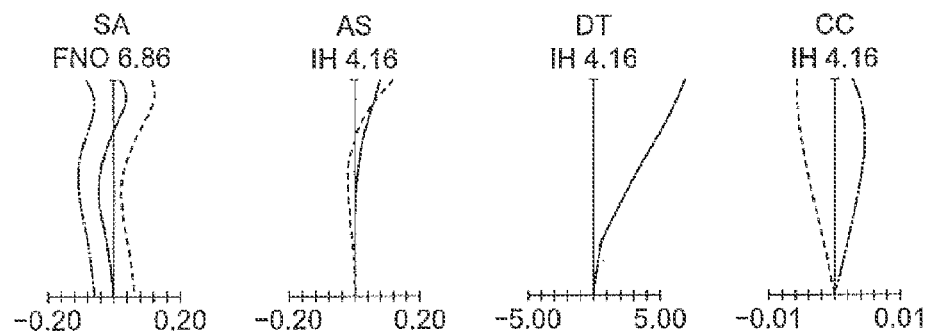

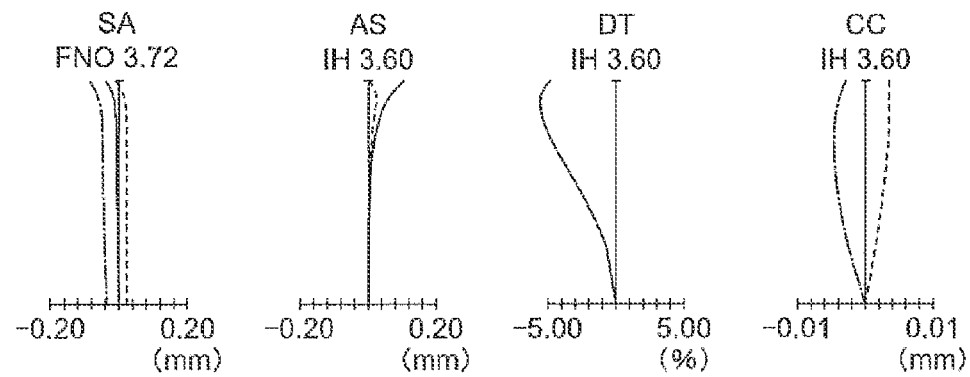
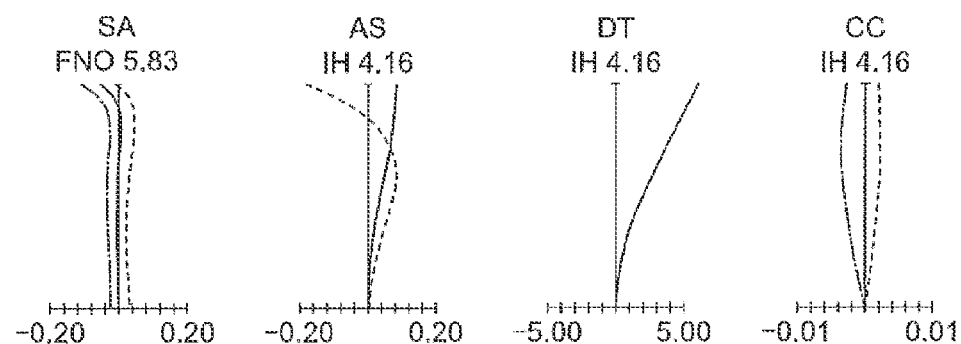
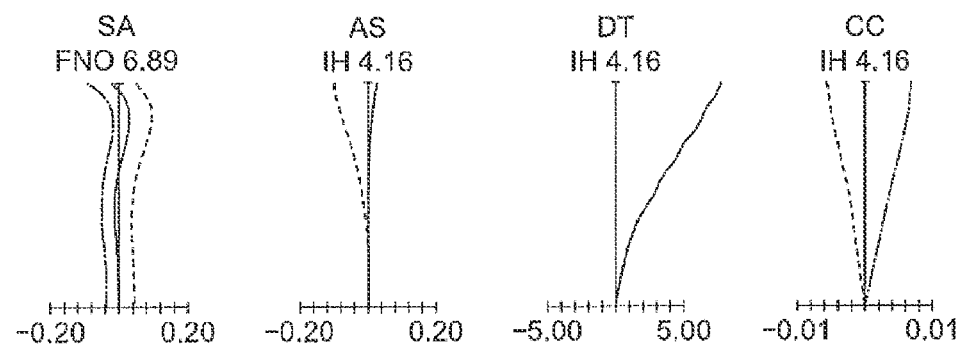

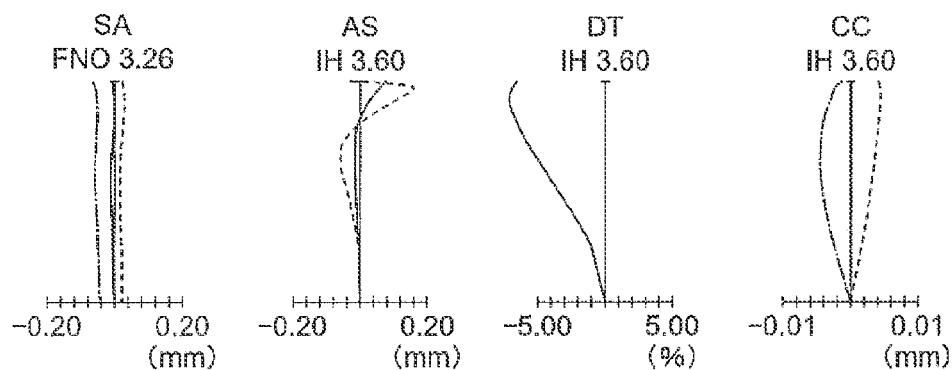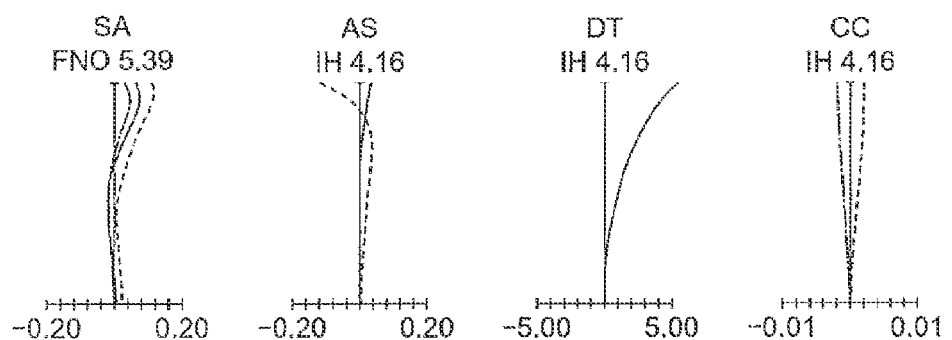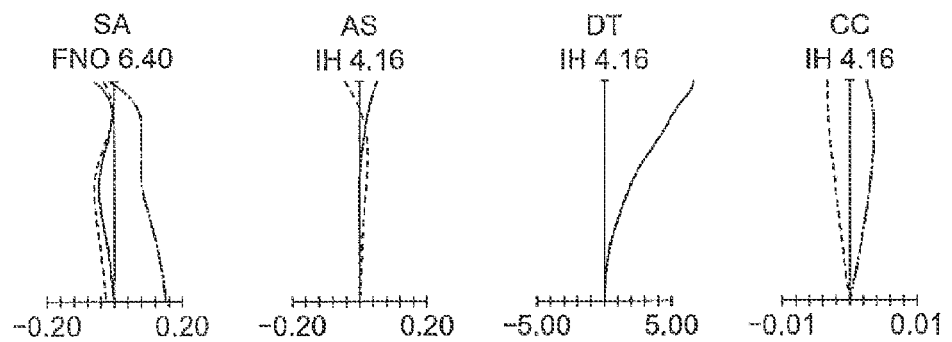

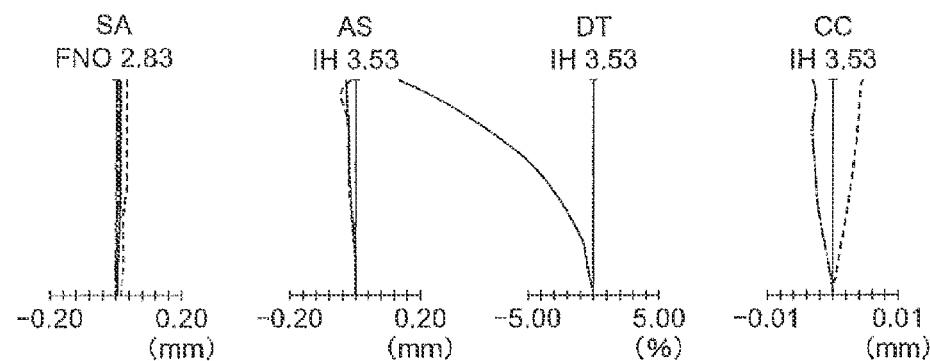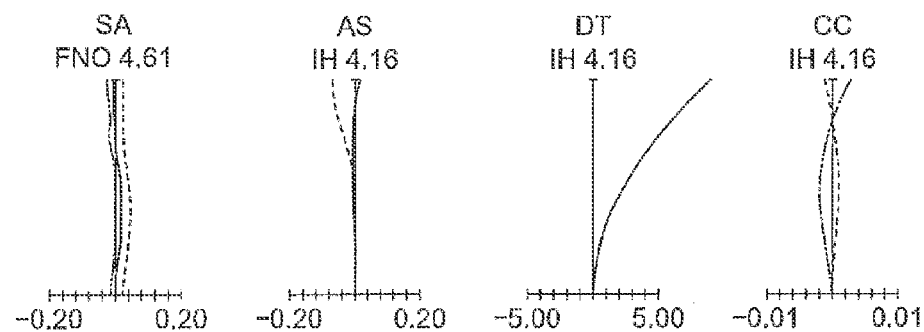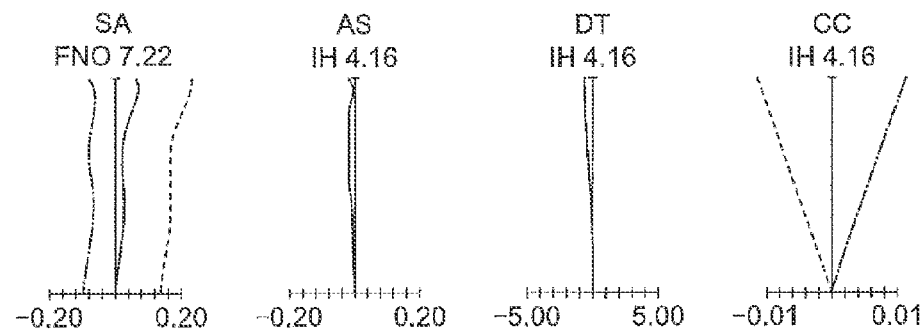

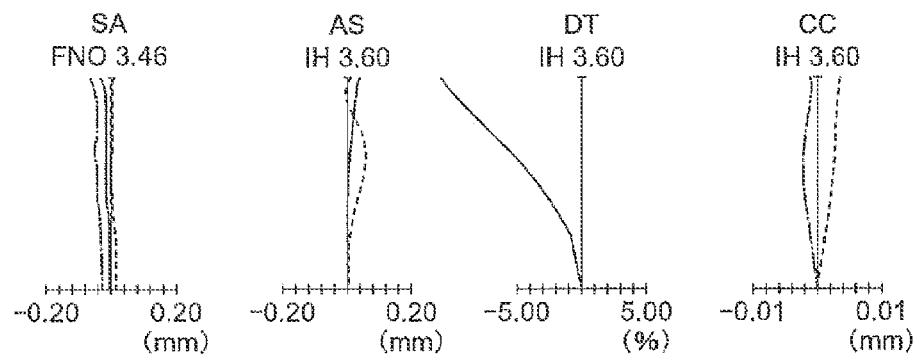
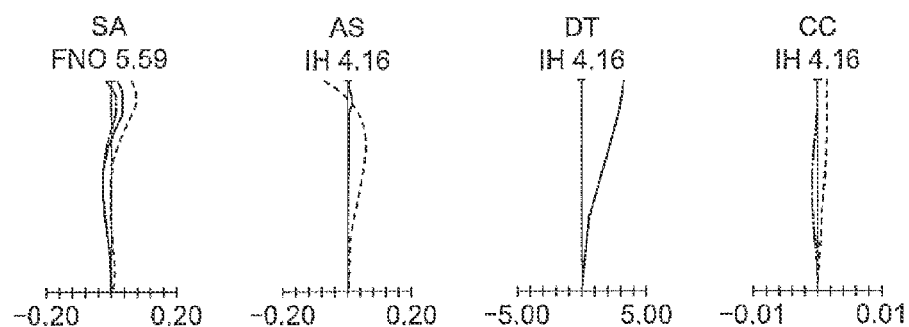
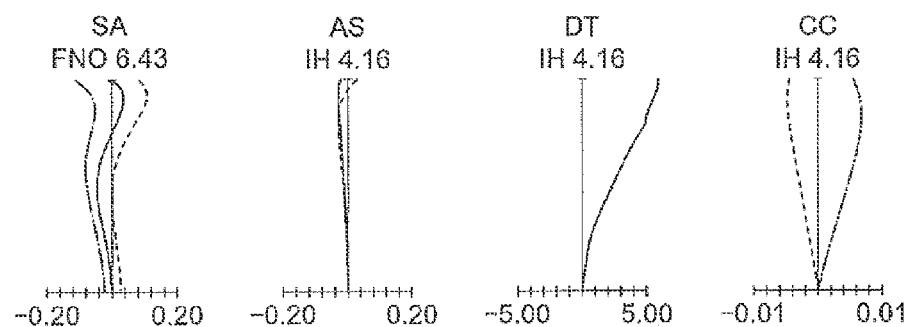

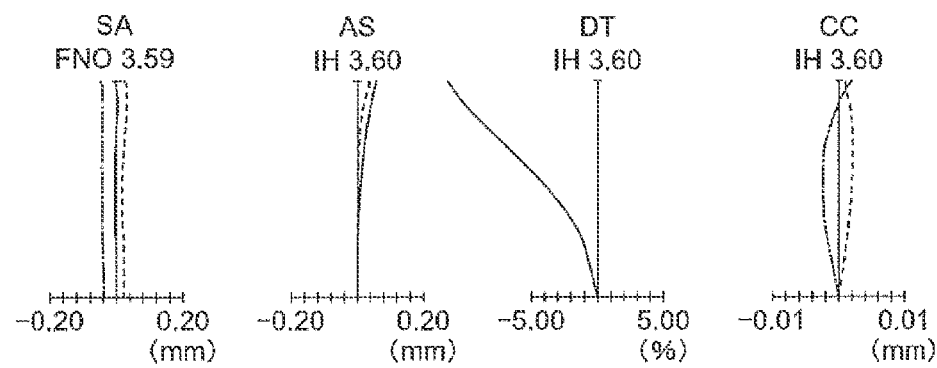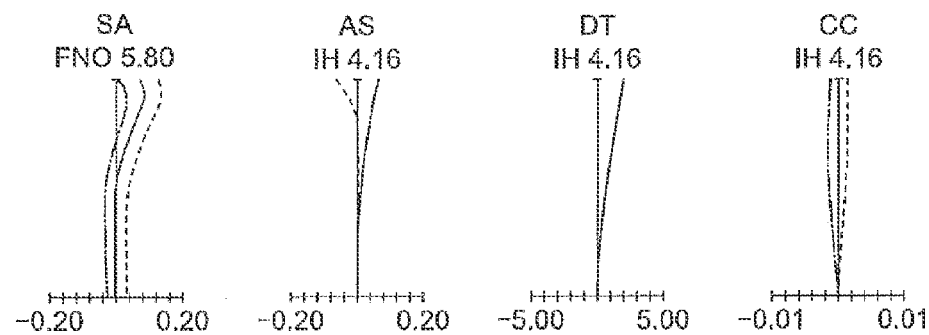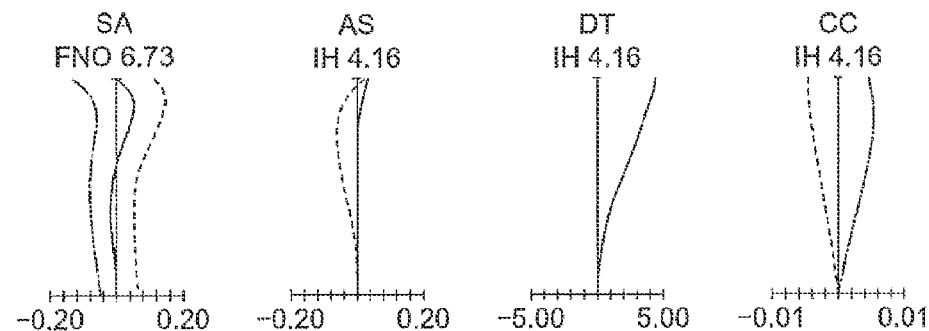

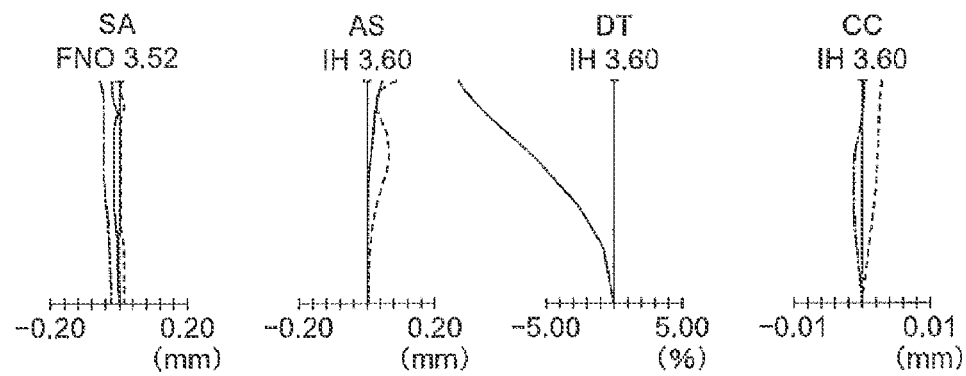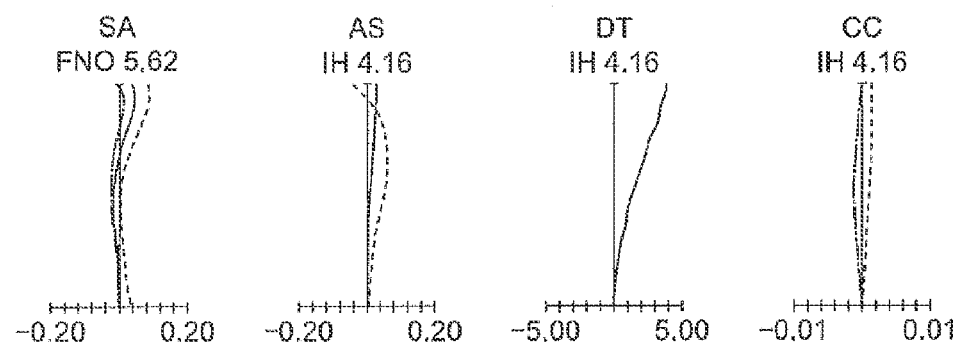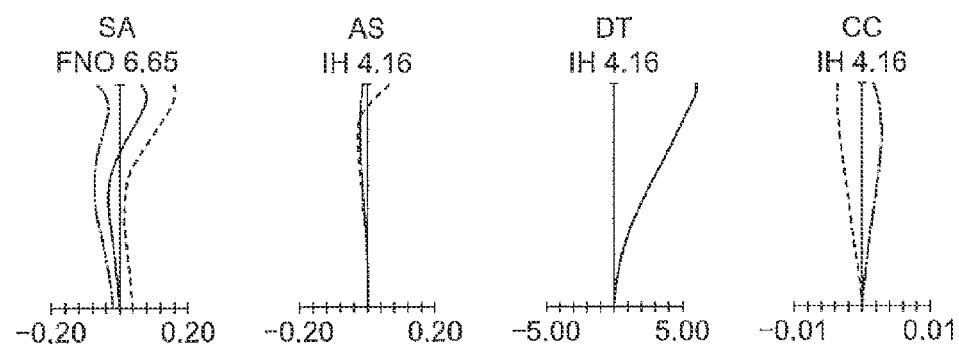

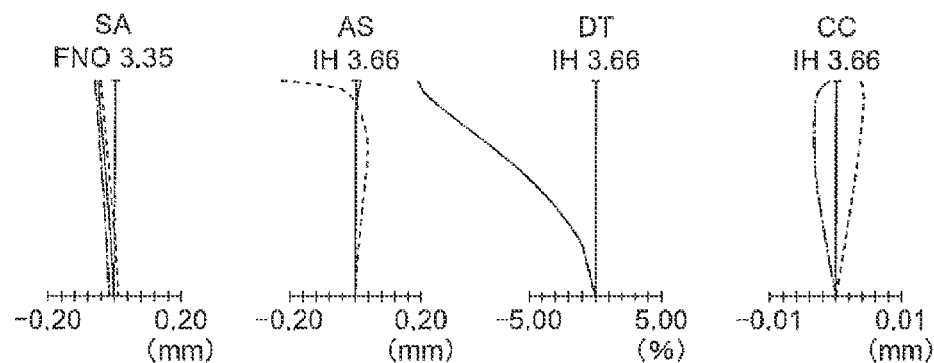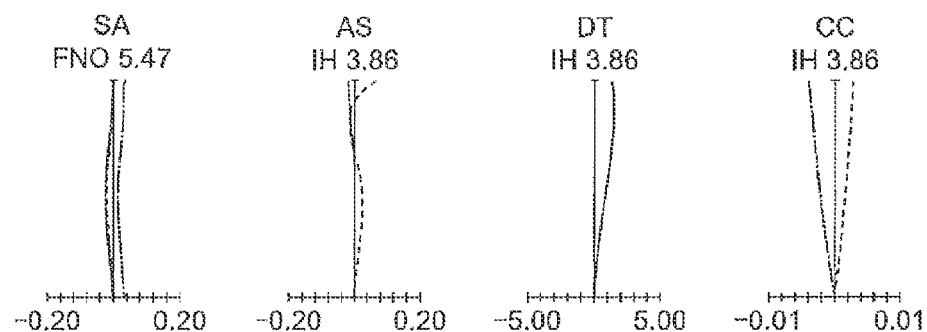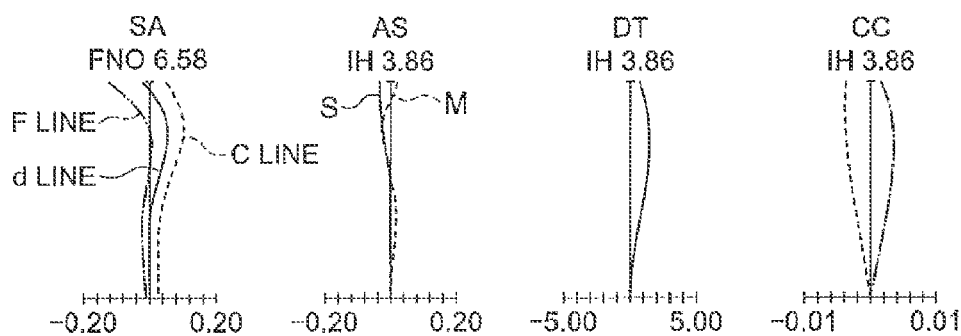

ZOOM LENS AND IMAGE PICKUP APPARATUS USING THE SAME

CROSS-REFERENCE TO RELATED APPLICATION

The present application is a divisional application of U.S. patent application Ser. No. 13/747,194 filed on Jan. 22, 2013, which is based upon and claims the benefit of priority from the prior Japanese Patent Application Nos. 2012-035705 filed on Feb. 22, 2012 and 2012-140444 filed on Jun. 22, 2012; the entire contents of which are incorporated herein by reference.

BACKGROUND OF THE INVENTION

1. Field of the Invention

The present invention relates to a zoom lens. Or, the present invention relates to an image pickup apparatus such as a digital camera and a video camera which includes the zoom lens.

2. Description of the Related Art

In recent years, electronic image pickup apparatuses such as a digital camera and a video camera in which, an arrangement is made to photograph an object by using not a film but an image pickup element such as a CCD (Charge Coupled Device) and a CMOS (Complementary Metal Oxide Semiconductor) sensor, have become mainstream.

The electronic image pickup apparatuses such as digital cameras of a high-function type for professional use, digital cameras of a portable popular type, and monitoring (security) cameras are in a widespread use.

In these electronic image pickup apparatuses, a zoom lens in which, it is possible to make a change in an angle of view of photography assuming various photographic scenes, has been preferred.

As a zoom lens which is advantageous for securing both a zoom ratio and a brightness at a telephoto end, a zoom lens having an arrangement of a plurality of lens units not less than four which includes in order from an object side to an image side, a first lens unit having a positive refractive power, a second lens unit having a negative refractive power, and a plurality of lens units has been known.

As a zoom lens which includes not less than four lens units in such manner, zoom lenses in Japanese Patent Application Laid-open Publication Nos. 2003-57544, 2005-316047, 2010-91881, and 2011-247949 have been known.

SUMMARY OF THE INVENTION

A zoom lens according to a first aspect of the present invention comprises in order from an object side to an image side,
a first lens unit having a positive refractive power,
a second lens unit having a negative refractive power, and
a plurality of lens units, and
zooming from a wide angle end to a telephoto end is carried out by changing each distance between the lens units, and
the first lens unit comprises in order from the object side to the image side,
a negative lens which is a single lens of which, an object-side surface and an image-side surface make a contact with air, and
a positive lens which is a single lens of which, an object-side surface and an image-side surface make a contact with air, and the second lens unit comprises in order from the object side to the image side,
a front-side unit having a negative refractive power which includes a negative lens,
a rear-side unit having a positive lens which is a single lens of which, an object-side surface and an image-side surface make a contact with air, and a negative lens which is a single lens of which, an object-side surface and an image-side surface make a contact with air, and
the second lens unit does not include a lens unit other than the front-side unit and the rear-side unit, and
the following conditional expressions (1), (6), and (7) are satisfied:

$$5.3 < ft/fw \qquad (1)$$

$$-0.3 < n1n - n21n < -0.09 \qquad (6)$$

$$n2p - n21n < -0.09 \qquad (7)$$

where,
ft denotes a focal length at the telephoto end of the zoom lens,
fw denotes a focal length at the wide angle end of the zoom lens,
n1n denotes a refractive index with reference to a d-line of the negative lens in the first lens unit,
n21n denotes a refractive index with reference to the d-line of the negative lens in the front-side unit, and
n2p denotes a refractive index with reference to the d-line of the positive lens in the rear-side unit.

A zoom lens according to a second aspect of the present invention comprises in order from an object side to an image side,
a first lens unit having a positive refractive power,
a second lens unit having a negative refractive power, and
a plurality of lens units, and
zooming from a wide angle end to a telephoto end is carried out by changing each distance between the lens units, and
both the first lens unit and the second lens unit comprise a plastic lens, and
the second lens unit comprises in order from the object side to the image side,
a front-side unit having a negative refractive power which includes a negative lens, and
a rear-side unit which includes a positive lens and a negative lens, and
the second lens unit does not include a lens unit other than the front-side unit and the rear-side unit, and
the negative lens in the front-side unit is a glass lens, and
both the positive lens and the negative lens in the rear-side unit are plastic lenses which are single lenses of which, an object-side surface and an image-side surface make a contact with air.

A zoom lens according to a third aspect of the present invention comprises in order from an object side to an image side,
a first lens unit having a positive refractive power,
a second lens unit having a negative refractive power, and
a plurality of lens units, and
zooming from a wide angle end to a telephoto end is carried out by changing each distance between the lens units, and
the first lens unit comprises in order from the object side to the image side,
a negative lens and a positive lens, and both the negative lens in the first lens unit and the positive lens in the first lens unit are plastic lenses which are single lenses of which, an object-side surface and an image-side surface make a contact with air, and the following conditional expression (1) is satisfied:

$$5.3<ft/fw \quad (1)$$

where, ft denotes a focal length at the telephoto end of the zoom lens, and fw denotes a focal length at the wide angle end of the zoom lens.

A zoom lens according to a fourth aspect of the present invention comprises in order from an object side to an image side, a first lens unit having a positive refractive power,
a second lens unit having a negative refractive power, and
a plurality of lens units, and zooming from a wide angle end to a telephoto end is carried out by changing each distance between the lens units, and the second lens unit comprises in order from the object side to the image side, a front-side unit having a negative refractive power which includes a negative lens, and a rear-side unit which includes a positive lens and a negative lens, and the second lens unit does not include a lens unit other than the front-side unit and the rear-side unit, and the negative lens in the front-side unit is a glass lens, and both the positive lens and the negative lens in the rear-side unit are plastic lenses which are single lenses of which, an object-side surface and an image-side surface are in contact with air, and the following conditional expression (1) is satisfied:

$$5.3<ft/fw \quad (1)$$

where, ft denotes a focal length at the telephoto end of the zoom lens, and fw denotes a focal length at the wide angle end of the zoom lens.

A zoom lens according to a fifth aspect of the present invention comprises in order from an object side to an image side, a first lens unit having a positive refractive power,
a second lens unit having a negative refractive power, and
a plurality of lens units, and zooming from a wide angle end to a telephoto end is carried out by changing each distance between the lens units, and the first lens unit comprises in order from the object side to the image side, a negative lens and a positive lens, and the negative lens in the first lens unit is a plastic lens which is a single lens of which, an object-side surface and an image-side surface make a contact with air, and the following conditional expressions (1) and (2) are satisfied:

$$5.3<ft/fw \quad (1)$$

$$n1n<1.7 \quad (2)$$

where, ft denotes a focal length at the telephoto end of the zoom lens, fw denotes a focal length at the wide angle end of the zoom lens, and n1n denotes a refractive index with reference to a d-line of the negative lens in the first lens unit.

A zoom lens according to a sixth aspect of the present invention comprises in order from an object side to an image side, a first lens unit having a positive refractive power,
a second lens unit having a negative refractive power,
a third lens unit having a positive refractive power, and
a fourth lens unit having a positive refractive power, and zooming from a wide angle end to a telephoto end is carried out by changing each distance between the lens units, and the zoom lens is a four-unit zoom lens, and the first lens unit comprises in order from the object side to the image side, a negative lens and a positive lens, and the total number of lenses in the first lens unit is two, and the third lens unit comprises, a positive lens component having a positive refractive power, which is a lens component positioned nearest to the object side in the third lens unit, and a negative lens component having a negative refractive power, which is a lens component positioned nearest to the image side in the third lens unit, and the positive lens component and the negative lens component form a lens block having only two surfaces which make a contact with air in an optical path, namely an object-side surface and an image-side surface, and the following conditional expressions (11), (12), and (13) are satisfied:

$$2.5<f1p/f3p \quad (11)$$

$$-3.4<f1 \times f2/f3^2<-2.4 \quad (12)$$

$$-0.3<h3f/f3<-0.14 \quad (13)$$

where, f1p denotes a focal length of the positive lens in the first lens unit, f3p denotes a focal length of the positive lens component in the third lens unit, f1 denotes a focal length of the first lens unit, f2 denotes a focal length of the second lens unit, f3 denotes a focal length of the third lens unit, and h3f denotes an optical axial distance from a surface of incidence of the third lens unit up to a principal point of the third lens unit, and has a negative (minus) sign when the principal point is on the object side of (than) the surface of incidence, and has a positive (plus) sign when the principal point is on the image side of (than) the surface of incidence.

An image pickup apparatus according to the present invention comprises the zoom lens, and an image pickup element which is disposed on an image side of the zoom lens, and which has an image pickup surface which picks up an image formed by the zoom lens, and which converts the image picked up to an electric signal.

BRIEF DESCRIPTION OF THE DRAWINGS

FIG. 1A and FIG. 1B are lens cross-sectional views at the time of infinite of object point focusing of a zoom lens according to a first embodiment of the present invention, where, FIG. 1A shows a state at a wide angle end and FIG. 1B shows a state at a telephoto end, also FIG. 1A and FIG. 1B are diagrams showing a movement of each lens unit from the wide angle end to the telephoto end;

FIG. 4A and FIG. 4B are diagrams similar to FIG. 1A and FIG. 1B, of a zoom lens according to a fourth embodiment of the present invention;

FIG. 6A and FIG. 6B are diagrams similar to FIG. 1A and FIG. 1B, of a zoom lens according to a sixth embodiment of the present invention;

FIG. 9A and FIG. 9B are diagrams similar to FIG. 1A and FIG. 1B, of a zoom lens according to a ninth embodiment of the present invention;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L (hereinafter, 'FIG. 10A to FIG. 10L') are aberration diagrams at the time of infinite object point focusing according to the first embodiment;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L (hereinafter, 'FIG. 11A to FIG. 11L') are aberration diagrams at the time of infinite object point focusing according to the second embodiment;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L (hereinafter, 'FIG. 12A to FIG. 12L') are aberration diagrams at the time of infinite object point focusing according to the third embodiment;

FIG. 13A, FIG. 13B, FIG. 13C, FIG. 13D, FIG. 13E, FIG. 13F, FIG. 13G, FIG. 13H, FIG. 13I, FIG. 13J, FIG. 13K, and FIG. 13L (hereinafter, 'FIG. 13A to FIG. 13L') are aberration diagrams at the time of infinite object point focusing according to the fourth embodiment;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L (hereinafter, 'FIG. 14A to FIG. 14L') are aberration diagrams at the time of infinite object point focusing according to the fifth embodiment;

FIG. 15A, FIG. 15B, FIG. 15C, FIG. 15D, FIG. 15E, FIG. 15F, FIG. 15G, FIG. 15H, FIG. 15I, FIG. 15J, FIG. 15K, and FIG. 15L (hereinafter, 'FIG. 15A to FIG. 15L') are aberration diagrams at the time of infinite object point focusing according to the sixth embodiment;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L (hereinafter, 'FIG. 16A to FIG. 16L') are aberration diagrams at the time of infinite object point focusing according to the seventh embodiment;

FIG. 17A, FIG. 17B, FIG. 17C, FIG. 17D, FIG. 17E, FIG. 17F, FIG. 17G, FIG. 17H, FIG. 17I, FIG. 17J, FIG. 17K, and FIG. 17L (hereinafter, 'FIG. 17A to FIG. 17L') are aberration diagrams at the time of infinite object point focusing according to the eighth embodiment;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L (hereinafter, 'FIG. 18A to FIG. 18L') are aberration diagrams at the time of infinite object point focusing according to the ninth embodiment;

FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L (hereinafter, 'FIG. 24A to FIG. 24L') are aberration diagrams at the time of infinite object point focusing according to the tenth embodiment.

DETAILED DESCRIPTION OF THE INVENTION

Figures 2A, 2B:
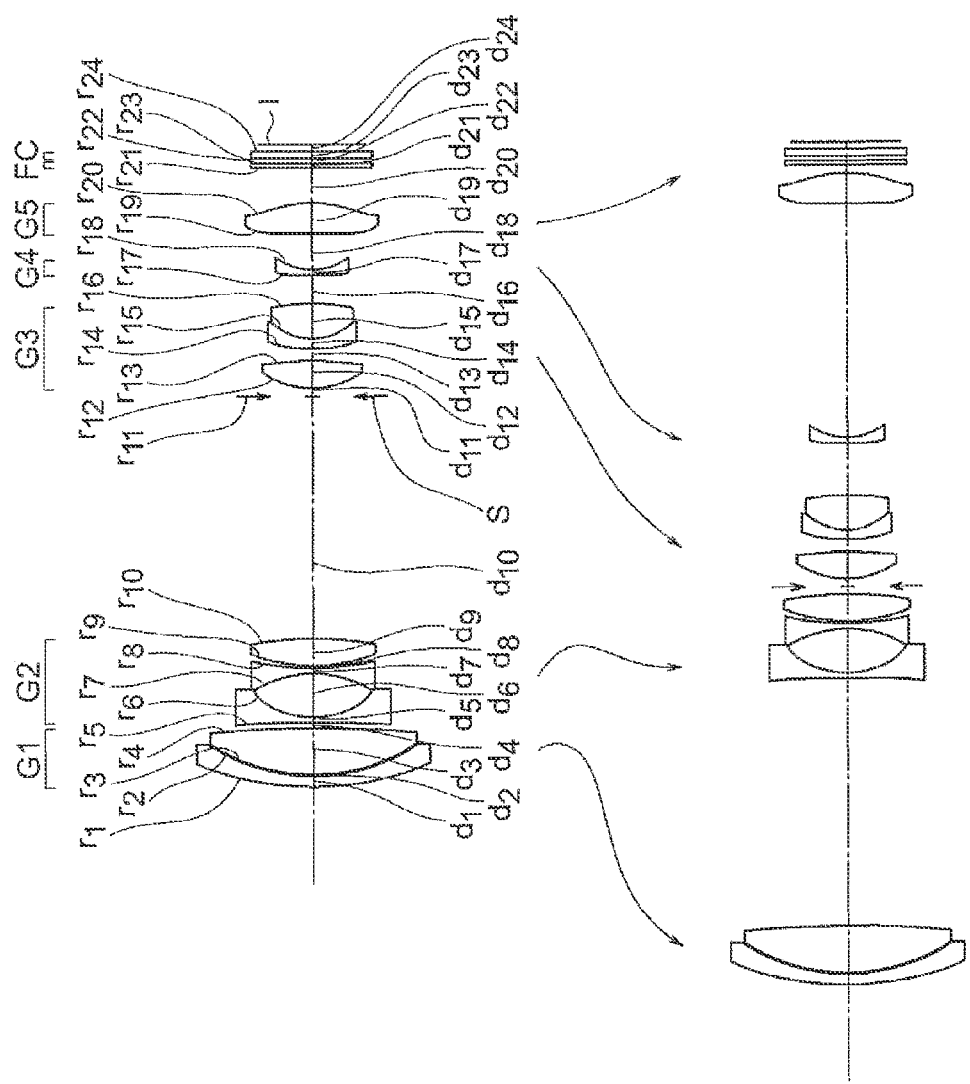
FIG. 2A and FIG. 2B are diagrams similar to FIG. 1A and FIG. 1B, of a zoom lens according to a second embodiment of the present invention.

A zoom lens according to embodiments have a basic arrangement (structure) which includes in order from an object side to an image side, a first lens unit having a positive refractive power, a second lens unit having a negative refractive power, and a plurality of lens units, and zooming from a wide angle end to a telephoto end is carried out by changing each distance between the lens units.

In a zoom lens according to a first aspect of the present embodiment, in addition to the abovementioned basic arrangement, the first lens unit includes in order from the object side to the image side, a negative lens and a positive lens, and the second lens unit includes in order from the object side to the image side, a front-side unit having a negative refractive power which includes a negative lens, and a rear-side unit which includes a positive lens and a negative lens.

Moreover, the zoom lens according to the first aspect of the present invention satisfies the following conditional expressions (1), (6), and (7):

$$5.3 < ft/fw \quad (1)$$

$$-0.3 < n1n - n21n < -0.09 \quad (6)$$

$$n2p - n21n < -0.09 \quad (7)$$

where, ft denotes a focal length at the telephoto end of the zoom lens, fw denotes a focal length at the wide angle end of the zoom lens, n1n denotes a refractive index with reference to a d-line of the negative lens in the first lens unit, n21n denotes a refractive index with reference to the d-line of the negative lens in the front-side unit, and n2p denotes a refractive index with reference to the d-line of the positive lens in the rear-side unit.

By securing a zoom ratio such that a lower limit value of conditional expression (1) is reached, it is possible to change an angle of view of the zoom lens, and therefore such an arrangement is convenient.

Moreover, by arranging the negative lens and the positive lens from the object side in the first lens unit, it is advantageous for reducing aberrations.

Suppressing the refractive index of both the negative lens in the first lens unit and the positive lens in the second lens unit such that an upper limit value of conditional expressions (6) and (7) is not surpassed, leads to a cost reduction of lenses which form the first lens unit and the second lens unit. Or, by making the refractive index of the negative lens in the front-side unit high, it leads to securing a negative refractive power which is necessary for the second lens unit, and it advantageous for securing the zoom ratio.

By suppressing moderately a difference in the refractive index of the negative lens in the first lens unit and the refractive index of the negative lens in the front-side unit such that a lower limit value of conditional expression (6) is reached, an excess of the refractive index of the negative lens in the front-side unit of which a diameter is susceptible to become large, is suppressed, and it is advantageous from a point of view of material-cost.

Furthermore, by letting both the positive lens and the negative lens in the first lens unit to be single lenses, it is advantageous for securing a degree of freedom of selecting materials, the number of refracting surfaces, and a degree of freedom of shape of a lens surface, and therefore such an arrangement is preferable.

Moreover, by letting both the positive lens and the negative lens in the rear-side unit to be singles lenses, it is advantageous for securing the degree of freedom of selecting materials, the number of refracting surfaces, and the degree of freedom of a shape of a lens surface, and therefore such an arrangement is preferable.

In a zoom lens according to a second aspect of the present embodiment, in addition to the abovementioned basic arrangement, both the first lens unit and the second lens unit include a plastic lens, and the second lens unit includes in order from the object side to the image side, a front-side unit having a negative refractive power which includes a negative lens, and a rear-side unit which includes a positive lens and a negative lens.

Moreover, the negative lens in the front-side unit is a glass lens, and both the positive lens and the negative lens in the rear-side unit are plastic lenses.

The first lens unit and the second lens unit are lens units which are susceptible to become large in a radial direction. When an attempt is made to widen an angle of view or to achieve a high zoom ratio, the first lens unit and the second lens units are even more susceptible to become large.

Therefore, disposing a plastic lens in both the first lens unit and the second lens unit leads to reduction in weight of a large-diameter lens and a reduction in material cost.

Using a plurality of plastic lenses in the second lens unit leads to a reduction in cost of the second lens unit. Whereas, when the negative refractive power of the second lens unit becomes too weak, the overall length of the zoom lens at the wide angle end is susceptible to become long.

Therefore, by using a glass lens having a negative refractive power for the front-side unit in the second lens unit, it becomes easy to secure sufficient negative refractive power of the second lens unit. On the other hand, disposing the positive lens and the negative lens of plastic in the rear-side unit of the second lens unit is advantageous for achieving both, securement of the sufficient negative refractive power and cost reduction of the second lens unit, and securement of an optical performance.

Furthermore, letting both the positive lens and the negative lens made of plastic in the rear-side unit to be a single lens, is advantageous for securing the degree of freedom of selecting materials, the number of refracting surfaces, and the degree of freedom of a shape of a lens surface, and therefore such an arrangement is preferable. A plastic lens is susceptible to undergo a change in volume due to a temperature change, and an amount of change in volume due to a temperature change varies from material to material. In a case of letting a part of a cemented lens to be a plastic lens, it is necessary to bring closer the characteristics of lenses which are to be cemented. By letting a plastic lens to be a single lens, the degree of selection of plastic material due to the change in temperature becomes high, and therefore such an arrangement is preferable.

In a zoom lens according to a third aspect of the present embodiment, in addition to the abovementioned basic arrangement, the first lens unit includes in order from the object side to the image side, a negative lens and a positive lens, and the negative lens in the first lens unit and the positive lens in the first lens unit are plastic lenses, and the zoom lens satisfies the abovementioned conditional expression (1).

Significance of conditional expression (1) has already been described.

Moreover, in the first lens unit, by disposing the negative lens and the positive lens from the object side, it is advantageous for reduction of aberration.

However, when zoom ratio is secured, a size in a radial direction of the first lens unit is susceptible to become large. Letting the negative lens and the positive lens in the first lens unit to be a plastic lens is advantageous for a cost reduction of the first lens unit.

Furthermore, letting both the positive lens and the negative lens made of plastic in the first lens unit to be single lenses is advantageous for securing the degree of freedom of selecting materials, the number of refracting surfaces, and the degree of freedom of a shape of a lens surface, and therefore such an arrangement is preferable.

In a zoom lens according to a fourth aspect of the present embodiment, in addition to the abovementioned basic arrangement, the second lens unit includes in order from the object side to the image side, a front-side unit having a negative refractive power which includes a negative lens, and a rear-side unit which includes a positive lens and a negative lens.

Moreover, the negative lens in the front-side unit is a glass lens, and both the positive lens and the negative lens in the rear-side unit are plastic lenses, and the zoom lens satisfies the abovementioned conditional expression (1).

The significance of conditional expression (1) has already been described.

However, when the zoom ratio is secured, a size in a radial direction of the second lens unit is susceptible to become large.

Letting the second lens unit have the abovementioned arrangement is advantageous for small-sizing by securing sufficient refractive power of the second lens unit, cost reduction, and securing an optical performance.

Furthermore, letting both the positive lens and the negative lens made of plastic in the rear-side unit to be single lenses is advantageous for securing the degree of freedom of selecting materials, the number of refracting surfaces, and the degree of freedom of shape of a lens surface, and therefore such an arrangement is preferable.

In a zoom lens according to a fifth aspect of the present embodiment, in addition to the abovementioned basic arrangement, the first lens includes in order from the object side to the image side, a negative lens and a positive lens, and the negative lens in the first lens unit is a plastic lens, and the zoom lens satisfies the following conditional expressions (1) and (2):

$$5.3 < ft/fw \tag{1}$$

$$n1n < 1.7 \tag{2}$$

where, ft denotes a focal length at the telephoto end of the zoom lens, fw denotes a focal length at the wide angle end of the zoom lens, and n1n denotes a refractive index with reference to a d-line of the negative lens in the first lens unit.

The significance of conditional expression (1) has already been described.

However, when the zoom ratio is secured, the first lens unit is susceptible to become large in the radial direction. An effective aperture of the negative lens nearest to the object side in particular, is susceptible to become large.

As mentioned above, letting the negative lens in the first lens unit to be a plastic lens leads to a weight reduction of the negative lens having a large diameter and a material-cost reduction.

Conditional expression (2) is a conditional expression which specifies a preferable refractive index of the negative lens in the first lens unit.

By letting the negative lens to be a plastic lens having a lower refractive index so that an upper limit value of conditional expression (2) is not surpassed, it is advantageous for cost reduction and securing sufficient positive refractive power of the first lens unit.

Here, by forming the plastic lens by a single lens of which, an object-side surface and an image-side surface make a contact with air, it is advantageous for securing the degree of freedom of selection of a material, the number of refractive surfaces, and the degree of freedom of a shape of a lens surface, and therefore such an arrangement is preferable.

By satisfying a plurality of abovementioned arrangements simultaneously, it is possible to have more assured effect, and therefore it preferable that the zoom lens satisfies the plurality of abovementioned arrangements simultaneously.

Moreover, it is preferable that the zoom lens according to the embodiment satisfies simultaneously one of or a plurality of the arrangements described below.

In the zoom lens according to the embodiments, it is preferable that when the first lens unit includes a negative lens and a positive lens, the negative lens and the positive lens in the first lens unit are plastic lenses which satisfy the following conditional expressions (2) and (3):

$$n1n < 1.7 \quad (2)$$

$$20 < |v1n - v1p| < 60 \quad (3)$$

where, v1n denotes Abbe number with reference to the d-line of the negative lens in the first lens unit, v1p denotes Abbe number with reference to the d-line of the positive lens in the first lens unit, and v1n<v1p.

The significance of conditional expression (2) has already been described.

Securing difference Abbe number such that a lower limit value of conditional expression (3) is reached is advantageous for correction of a chromatic aberration. By making an arrangement such that an upper limit value of conditional expression (3) is not surpassed, it is possible to make a combination of plastic materials which are easy to process.

It is preferable that the zoom lens includes in order from the object side to the image side, a first lens unit having a positive refractive power, a second lens unit having a negative refractive power, a third lens unit having a positive refractive power, and a fourth lens unit having a positive refractive power.

By making an arrangement such that the zoom lens is let to be a four-unit zoom lens including in order from the object side to the image side, a lens unit having a positive refractive power, a lens unit having a negative refractive power, a lens unit having a positive refractive power, and a lens unit having a positive refractive power, it is advantageous for securing sufficient zoom ratio and securing a function of alienating an exit pupil from an image plane, thereby making it suitable for a zoom lens to be used in an image pickup apparatus using an electronic image pickup element.

It is preferable that the second lens unit includes a front-side unit having a negative refractive power and a rear-side unit, and the rear-side unit includes in order from the object side to the image side, a negative lens and a positive lens.

By making an arrangement such that the second lens unit includes the front-side unit having a negative refractive power, and the rear-side unit which includes the negative lens and the positive lens in order from the object side to the image side, it is easy to bring an entrance pupil toward the object side, and it is advantageous for achieving both of a widening on an angle of view and small-sizing.

It is preferable that the zoom lens according to the embodiments includes in order from the object side to the image side, a first lens unit having a positive refractive power, a second lens unit having a negative refractive power, a third lens unit having a positive refractive power, and a fourth lens unit having a positive refractive power, and the zoom lens satisfies the following conditional expression (8):

$$2.0 < \beta 3t/\beta 3w \quad (8)$$

where,

β3t denotes a lateral magnification at the telephoto end of the third lens unit, and β3w denotes a lateral magnification at the wide angle end of the third lens unit.

Conditional expression (8) is a conditional expression which specifies a preferable load of zooming of (on) the third lens unit.

By securing the load of zooming of the third lens unit such that a lower limit value of conditional expression (8) is reached, it is possible to reduce a load of zooming of (on) the second lens unit, and it becomes easy to reduce an effect of aberration which is caused due to using low-cost lenses in the first lens unit or the second lens unit, of which a diameter is susceptible to become large.

When the cost reduction is taken into consideration, it is preferable that the negative lens in the rear-side unit and the positive lens in the rear-side unit are plastic lenses which satisfy the following conditional expressions (4) and (5A):

$$n22n < 1.55 \quad (4)$$

$$n2p < 1.7 \quad (5A)$$

where, n22n denotes a refractive index with reference to a d-line of the negative lens in the rear-side unit, and n2p denotes a refractive index with reference to the d-line of the positive lens in the rear-lens unit.

When both the negative lens and the positive lens in the rear-side unit are let to be plastic lenses having a low refractive index for which, an upper limit value of each of conditional expressions (4) and (5A) is not surpassed, it is advantageous for cost reduction.

On the other hand, taking into consideration an improvement in optical performance, it is preferable that the positive lens in the rear-side unit is a plastic lens which has an aspheric surface, and which satisfies the following conditional expressions (5B) and (10):

$$1.64 < n2p \quad (5B)$$

$$\nu 2p < 37 \quad (10)$$

where,
ν2p denotes Abbe number with reference to the d-line of the positive lens in the rear-side unit.

By letting the positive lens to be a plastic lens, a use of an aspheric surface becomes easy. An aberration correction function can be secured by an effect of the aspheric surface. In this case, by making an arrangement such that the refractive index of the positive lens reaches a lower limit value of conditional expression (5B), the effect of the aspheric surface can be achieved sufficiently even by making a shape of the aspheric surface simple. Moreover, such an arrangement is also advantageous for reducing an effect on a decentering aberration when the positive lens is decentered. By making an arrangement such that an upper limit value of conditional expression (10) is not surpassed, it is possible to impart a function which is sufficient for cancelling the chromatic aberration.

It is preferable that the zoom lens includes in order from the object side to the image side, a first lens unit having a positive refractive power, a second lens unit having a negative refractive power, a third lens unit having a positive refractive power, and the fourth lens unit having a positive refractive power, and the zoom lens satisfies the following conditional expression (9):

$$0.5 < (\beta 3t/\beta 3w)/(\beta 2t/\beta 2w) < 1.3 \quad (9)$$

where,
β3t denotes a lateral magnification at the telephoto end of the third lens unit,
β3w denotes a lateral magnification at the wide angle end of the third lens unit,
β2t denotes a lateral magnification at the telephoto end of the second lens unit, and
β2w denotes a lateral magnification at the wide angle end of the second lens unit.

Conditional expression (9) is a conditional expression which specifies a favorable ratio of a load of zooming of (on) the third lens unit and a load of zooming of (on) the second lens unit.

It is preferable to secure sufficient load of zooming of the third lens unit by making an arrangement such that a lower limit value of conditional expression (9) is reached, and to reduce the load of zooming of the second lens unit. In a case in which, low cost lenses are used for lenses of the first lens unit or the second lens unit of which, a lens diameter is susceptible to become large, when the refractive power of the second lens unit is made high, and the load of zooming on the second lens unit becomes excessively large, an aberration fluctuation is susceptible to become large. By imparting the load of zooming also to the third lens unit such that the lower limit value of conditional expression (9) is reached, it becomes easy to reduce the aberration fluctuation which is accompanied with zooming, and therefore such an arrangement is preferable.

It is preferable to secure moderately the load of zooming of the second lens unit by making an arrangement such that an upper limit value of conditional expression (9) is not surpassed, and to reduce the aberration fluctuation due to excessive load of zooming on the third lens unit.

It is preferable that the first lens unit includes in order from the object side to the image side, two lenses namely a negative lens and a positive lens.

Such an arrangement is advantageous for achieving both, a compactness and reduction of aberration in the first lens unit.

It is preferable that the second lens unit includes in order from the object side three lenses namely, a first negative lens, a second negative lens, and a positive lens.

By making such an arrangement, it is possible to bring the entrance pupil toward the object side, and also it is advantageous for achieving both aberration correction and the compactness.

It is preferable that the third lens unit includes in order from the object side to the image side, two lenses namely, a positive lens and a negative lens.

By making such an arrangement, it is possible to bring a principal point of the third lens unit toward (nearer to) the object side with the fewer number of lenses, and such an arrangement is advantageous for securing sufficing zoom ratio.

It is preferable that the second lens unit includes a front-side unit having a negative refractive power, and a rear-side unit having a negative lens and a positive lens, and both the negative lens in the rear-side unit and the positive lens in the rear-side unit are plastic lenses. Moreover, it is preferable that an object-side surface of the negative lens in the rear-side unit and an image-side surface of the positive lens in the rear-side unit are both aspheric surfaces.

Such an arrangement is advantageous for making the zoom lens to be low cost. By disposing the aspheric surfaces at the abovementioned positions, it is advantageous for correction of a curvature of field, a chromatic aberration of magnification near the wide angle end, and a spherical aberration near the telephoto end.

Furthermore, it is preferable that both an image-side surface of the negative lens in the rear-side unit and an object-side surface of the positive lens in the rear-side unit are spherical surfaces.

By making such an arrangement, it is easy to reduce an occurrence of a decentered aberration when the negative lens and the positive lens in the rear-side unit are decentered.

It is preferable that the zoom lens includes an aperture stop which, at the time of zooming from the wide angle end to the telephoto end, moves integrally with a lens unit nearest to the object side, from among lens units on the image side of the second lens unit.

Making such an arrangement is advantageous for small-sizing of the overall zoom lens, aberration correction, and adjustment of the exit pupil.

Moreover, for cutting off unnecessary light such as ghost and flare, a flare aperture apart from the aperture stop may be disposed. The flare aperture may be disposed at any of the locations such as on the object side of the first lens unit, between the first lens unit and the second lens unit, between the second lens unit and the third lens unit, between the third lens unit and the fourth lens unit, and between the fourth lens unit and the image plane.

Moreover, an anti-reflection coating may be applied to each lens to reduce the ghost and flare. Multi-coating is desirable as it enables to reduce the ghost and flare effectively. An arrangement in which, reflection is prevented by forming a micro spike pattern of an operating wavelength level on a lens surface may be made. Moreover, an infra-red ray cut-off coating may be applied on a lens surface and a cover glass immediately before an image pickup surface.

Moreover, it is preferable to carry out focusing by a lens unit nearest to the image side or a lens unit which is second from the image side. In a case of forming the zoom lens as a four-unit zoom lens or a five-unit zoom lens, it is possible to form the fourth lens unit or the fifth lens unit by one single lens or one cemented lens, and since it is possible to make a lens weight light, it is possible to make small a load which is exerted on a motor at the time of focusing. Furthermore, since it is possible to dispose a drive motor at an interior of a lens frame without an overall length being changed at the time of focusing, it is advantageous for making the lens frame compact. The focusing may be carried out by the first lens unit, the second lens unit, and the third lens unit. Moreover, the focusing may also be carried out by moving a plurality of lens units. Furthermore, the focusing may also be carried out by drawing out the whole of the zoom lens or some of the lenses in the zoom lens, and the focusing may also be carried out by drawing in some of the lenses.

A zoom lens according to a sixth aspect of the present embodiment is a four-unit zoom lens which includes in order from an object side to an image side, a first lens unit having a positive refractive power, a second lens unit having a negative refractive power, a third lens unit having a positive refractive power, and a fourth lens unit having a positive refractive power, and zooming from a wide angle end to a telephoto end is carried out by changing each distance between the lens units.

Moreover, the first lens unit includes in order from the object side to the image side, two lenses namely a negative lens and a positive lens, and the third lens unit includes a positive lens component having a positive refractive power, which is a lens component positioned nearest to the object side in the third lens unit, and a negative lens component having a negative refractive power, which is a lens component positioned nearest to the image side in the third lens unit.

In this case, the lens component forms a lens block having only two surfaces which make a contact with air in an optical path, namely an object-side surface and an image-side surface, and mean a single lens or a cemented lens.

By letting the zoom lens have such four-unit zoom lens arrangement, it is possible to secure sufficient zoom ratio even with fewer number of lenses, and also it is advantageous for securing a function of alienating the exit pupil from the image plane. Such zoom lens is advantageous as a zoom lens to be used in an image pickup apparatus which has an electronic image pickup element.

By disposing the negative lens and the positive lens in order from the object side in the first lens unit, it is advantageous for reducing an aberration.

By disposing the abovementioned positive lens component and the negative lens component in the third lens unit, it is easy to bring a front-side principal point of the third lens unit to (toward) the object side of a surface of incidence of the third lens unit. Accordingly, since it is possible to increase a change in magnification with respect to an amount of change in a distance between the second lens unit and the third lens unit, it leads to achieving both securing zoom ratio and shortening the distance between the second lens unit and the third lens unit.

An axial light beam from the second lens unit, upon being diverged, is incident on the third lens unit, and shortening of the distance between the second lens unit and the third lens unit is advantageous for securing brightness and making small an effective aperture of the third lens unit.

Moreover, it becomes easy to impart to the abovementioned negative lens component in the third lens unit a function of cancelling the spherical aberration and the coma which occur in the positive lens component in the third lens unit.

Moreover, it is preferable that the zoom lens satisfies the following conditional expressions (11), (12), and (13):

$$2.5 < f1p/f3p \qquad (11)$$

$$-3.4 < f1 \times f2/f3^2 < -2.4 \qquad (12)$$

$$-0.3 < h3f/f3 < -0.14 \qquad (13)$$

where, f1p denotes a focal length of the positive lens in the first lens unit, f3p denotes a focal length of the positive lens component in the third lens unit, f1 denotes a focal length of the first lens unit, f2 denotes a focal length of the second lens unit, f3 denotes a focal length of the third lens unit, and h3f denotes an optical axial distance from a surface of incidence of the third lens unit up to a principal point of the third lens unit, and has a negative (minus) sign when the principal point is on the object side of (than) the surface of incidence, and has a positive (plus) sign when the principal point is on the image side of (than) the surface of incidence.

By suppressing the refractive power of the positive lens in the first lens unit by making an arrangement such that a lower limit value of conditional expression (11) is reached, it becomes easy to reduce an occurrence of the coma, the curvature of field, and the chromatic aberration of magnification at the telephoto end even when the number of lenses in the first lens unit is let to be two.

Or, by securing sufficiently the refractive power of the positive lens component in the third lens unit, it is possible to make small the distance between the second lens unit and the third lens unit at the wide angle end, which is advantageous for small-sizing.

It is preferable to reduce the spherical aberration and the coma which occur in the third lens unit by suppressing the refractive power of the third lens unit moderately by making an arrangement such that a lower limit value of conditional expression (12) is reached. Moreover, an image forming function is to be carried out by the third lens unit and the fourth lens unit, and it is possible to make high the positive refractive power of the fourth lens unit. In this case, in a case of moving the fourth lens unit for focusing, it is useful for securing focusing sensitivity of the fourth lens unit. By securing the refractive power of the third lens unit by making an arrangement such that an upper limit value of conditional expression (12) is not surpassed, it is advantageous for shortening the overall length of the zoom lens. Moreover, by suppressing the refractive power of the first lens unit and the second lens unit moderately, it is advantageous for reducing the chromatic aberration of magnification and the curvature of field.

It is preferable to reduce the spherical aberration and the coma which occur in the third lens unit by suppressing the refractive power of the third lens unit by making an arrangement such that a lower limit value of conditional expression (13) is reached. Moreover, it becomes easy to secure the positive refractive power of the fourth lens unit, and in a case of moving the fourth lens unit for focusing, it is advantageous for securing focusing sensitivity of the fourth lens unit.

By securing the positive refractive power of the third lens unit by making an arrangement such that an upper limit value of conditional expression (13) is not surpassed, it becomes easy to secure zooming effect of the third lens unit. Moreover, by letting a front-side principal point of the third lens unit to be on the object side, the first lens unit at the time of the wide angle end comes closer to the third lens unit as a result, and it is advantageous for small sizing in the radial direction of the first lens unit.

Moreover, it is preferable that the zoom lens satisfies the following conditional expression (14):

$$2<(R1obj+R1nimg)/(R1obj-R1nimg)<7 \quad (14)$$

where,

R1obj denotes a paraxial radius of curvature of an object-side surface of the first lens unit, and R1nimg denotes a paraxial radius of curvature of an image-side surface of the negative lens in the first lens unit.

By the negative lens assuming a meniscus shape such that a lower limit value of conditional expression (14) is reached, it becomes easy to secure sufficiently the positive refractive power of the first lens unit by reducing the refractive power of the negative lens, and it is advantageous for shortening the overall length of the zoom lens.

By making an arrangement such that an upper limit value of conditional expression (14) is not surpassed, it becomes easy to secure a function of correcting chromatic aberration by the negative lens.

It is preferable that the zoom lens satisfies the following conditional expression (15):

$$-1.0<(R1obj+R1img)/(R1obj-R1img)<0.0 \quad (15)$$

where,

R1obj denotes the paraxial radius of curvature of the object-side surface of the first lens unit, and R1img denotes a paraxial radius of curvature of an image-side surface of the first lens unit.

By making the first lens unit biconvex-shaped by making an arrangement such that a lower limit value of conditional expression (15) is reached, it becomes easy to secure sufficiently the positive refractive power of the first lens unit, and it is advantageous for shortening the overall length of the zoom lens.

By suppressing the positive refractive power of the image-side surface of the first lens unit by making an arrangement such that an upper limit value of conditional expression (15) is not surpassed, the refractive power of the positive lens is suppressed, and it becomes easy to suppress the chromatic aberration in the first lens unit.

It is preferable that the zoom lens satisfies the following conditional expression (16):

$$-1.1<(R1pobj+R1img)/(R1pobj-R1img)<-0.5 \quad (16)$$

where,

R1pobj denotes a paraxial radius of curvature of an object-side surface of the positive lens in the first lens unit, and R1img denotes the paraxial radius of curvature of an image-side surface of the first lens unit.

By making an arrangement such that a lower limit value of conditional expression (16) is reached, it is possible to maintain the refractive power of the positive lens sufficiently, and by securing the refractive power of the first lens unit, it is advantageous for making small the overall length of the zoom lens.

By making an arrangement such that an upper limit value of conditional expression (16) is not surpassed, it is advantageous for reducing the chromatic aberration and the coma near the telephoto end.

Moreover, it is preferable that the zoom lens satisfies the following conditional expression (17):

$$-0.9<(R3obj+R3pimg)/(R3obj-R3pimg)<-0.5 \quad (17)$$

where,

R3obj denotes a paraxial radius of curvature of an object-side surface of the third lens unit, and R3pimg denotes a paraxial radius of curvature of an image-side surface of the positive lens component in the third lens unit.

By making an arrangement such that a lower limit value of conditional expression (17) is reached, it is possible to secure sufficiently the positive refractive power of the positive lens component, and it is advantageous for securing the refractive power of the third lens unit. By suppressing moderately the refractive power of the object-side surface of the positive lens component, it is advantageous for reducing the spherical aberration.

By making an arrangement such that an upper limit value of conditional expression (17) is not surpassed, it is possible to make a principal point of the positive lens component on (toward) the object side, and it becomes easy to make a front-side principal point of the overall third lens unit on (toward) the object side.

Moreover, it is preferable that the zoom lens satisfies the following conditional expression (18):

$$1.5<(R3nobj+R3img)/(R3nobj-R3img)<6 \quad (18)$$

where,

R3nobj denotes a paraxial radius of curvature of an object-side surface of the negative lens component in the third lens unit, and R3img denotes the paraxial radius of curvature of the image-side surface of the third lens unit.

By making an arrangement such that a lower limit value of conditional expression (18) is reached, it is possible to secure sufficiently a curvature of an exit surface of the third lens unit, and it becomes easy to make the front-side principal point of the overall third lens unit toward the object side. This is advantageous both for securing zoom ratio and for shortening the overall length of the zoom lens.

By making an arrangement such that an upper limit value of conditional expression (18) is not surpassed, the curvature of the exit surface of the third lens unit is suppressed, and it is advantageous for reducing the spherical aberration and the coma aberration.

Moreover, it is preferable that the object-side surface of the third lens unit is convex toward the object side, and the image-side surface of the third lens unit is concave toward the image side, and the zoom lens satisfies the following conditional expression (19):

$$0.7<R3obj/R3img<1.5 \quad (19)$$

where,

R3obj denotes the paraxial radius of curvature of the object-side surface of the third lens unit, and R3img denotes the paraxial radius of curvature of the image-side surface of the third lens unit.

By making it easy to secure the negative refractive power of the image-side surface of the third lens unit by making an arrangement such that a lower limit value of conditional expression (19) is reached, it becomes easy to make the principal point of the third lens unit on (toward) the object side.

By making an arrangement such that an upper limit value of conditional expression (19) is not surpassed, it is advantageous for securing the positive refractive power while suppressing an aberration of (in) the third lens unit.

Moreover, it is preferable that both the object-side surface and the image-side surface of the third lens unit are aspheric surfaces.

The aspheric surfaces for the object-side surface and the image-side surface of the third lens unit are advantageous for reducing the spherical aberration and the coma in the third lens unit.

For making the principal point of the third lens unit toward the object side while securing sufficiently the positive refractive power of the third lens unit, it is preferable to make the object-side surface of the third lens unit a convex surface and the image-side surface of the third lens unit a concave surface, and to increase a curvature of both the object-side surface and the image-side surface. By letting the object-side surface and the image-side surface of the third lens unit to be aspheric surfaces, it is possible to maintain optical performance, and therefore such an arrangement is preferable.

Moreover, it is preferable that the negative lens component in the third lens unit is a negative lens which satisfies the following conditional expression (20):

$$1.63 < n3n \qquad (20)$$

where, n3n denotes a refractive index with reference to a d-line of the negative lens in the third lens unit.

By the zoom lens satisfying conditional expression (20), a function of making (bringing) the front-side principal point of the third lens unit on (toward) the object side is improved. By making the refractive index of the negative lens in the third lens unit high, it is possible to reduce a curvature of the image-side surface, and it is also advantageous for reducing the spherical aberration and the coma.

Moreover, it is preferable that the total number of lens components in the third lens unit is two.

Furthermore, it is preferable that the total number of lenses in the third lens unit is two.

Such an arrangement is advantageous for small-sizing at the time of accommodating the zoom lens when not in use, in a main body of the image pickup apparatus.

Moreover, it is preferable that the zoom lens according to the sixth aspect satisfies one of (or a plurality of) arrangements of the zoom lens according to the abovementioned aspects from the first aspect to the fifth aspect. Moreover, in the zoom lenses according to the aspects from the first aspect to the fifth aspect, the preferable arrangement of the third lens unit described in the sixth aspect may be specified. In other words, the abovementioned conditions may be combined mutually.

For instance, in the zoom lens according to the sixth aspect, it is preferable that the zoom lens satisfies the abovementioned conditional expressions (2), (3), (8), and (9).

An image pickup apparatus according to the embodiment includes one of the abovementioned zoom lenses, and an image pickup element which is disposed on an image side of the zoom lens, and which has an image pickup surface which picks up an image formed by the zoom lens, and which converts the image picked up, to an electric image.

Accordingly, it is possible to provide an image pickup apparatus which includes the zoom lens which shows the abovementioned effects.

An amount of degradation of exposure in an area around image may be corrected by image processing.

Moreover, a distortion may be caused intentionally in an optical system, and the distortion may be corrected by image processing electrically after capturing an image.

It is preferable that a plurality of the abovementioned arrangements and conditional expressions are satisfied simultaneously.

Moreover, in a case in which, the zoom lens has a focusing mechanism, each of the abovementioned arrangements and conditional expressions is let to be an arrangement and a conditional expression in a state when the zoom lens has focused to the farthest object.

Moreover, when the following arrangements are made for the abovementioned conditional expressions, it is possible to have more assured effect, and therefore it is preferable to have the following arrangements.

For conditional expression (1), it is preferable to let the lower limit value to be 6.5.

Moreover, for conditional expression (1), by providing an upper limit value of 30, and making an arrangement such that the upper limit value of 30 is not surpassed, it becomes easy to reduce an increase in the overall length at the telephoto end.

Furthermore, it is more preferable to let the upper limit value to be 22.0.

For conditional expression (2), it is more preferable to let the upper limit value to be 1.64.

Moreover, for conditional expression (2), by providing a lower limit value of 1.5, and making an arrangement such that the lower limit value of 1.5 is reached, it becomes easy to secure sufficiently a function of dispersion by the negative lens made of plastic, and it is advantageous for reducing the chromatic aberration of the first lens unit.

For conditional expression (3), it is preferable to let the lower limit value to be 25, and 30 is more preferable.

Moreover, for conditional expression (3), it is preferable to let the upper limit value to be 50, and 40 is more preferable.

For conditional expression (4), it is more preferable to let the upper limit value to be 1.54.

By providing a lower limit value of 1.4, and making an arrangement such that the lower limit value of 1.4 is reached, it becomes easy to achieve the negative refractive power of the negative lens made of plastic, and it is advantageous for securing sufficient negative refractive power of the second lens unit, and for reducing aberration.

For conditional expression (5A), it is preferable to let the upper limit value to be 1.65 from a point of view of cost reduction.

Moreover, for conditional expression (5A), by providing a lower limit value of 1.6, and making an arrangement such that the lower limit value of 1.6 is reached, it becomes easy to achieve the positive refractive power of the positive lens made of plastic, and it is possible to make (bring) the principal point of the second lens unit on (toward) the object side. This is advantageous for making a size small in the radial direction of the second lens unit.

For conditional expression (5B), from a view point of aberration correction, it is preferable to let the lower limit value to be 1.67, and 1.70 is more preferable.

Moreover, for conditional expression (5B), by providing an upper limit value of 1.78, and making an arrangement such that the upper limit value of 1.78 is not surpassed, it is preferable from the point of view of material-cost reduction.

For conditional expression (6), it is preferable to let the lower limit value to be −0.21.

Moreover, for conditional expression (6), it is preferable to let the upper limit value to be −0.094.

For conditional expression (7), by providing a lower limit value of −0.2, and making an arrangement such that the lower limit value of −0.2 is reached, it is preferable from a point of view of suppressing a material cost of the negative lens in the front-side unit of the second lens unit.

Moreover, for conditional expression (7), it is preferable to let the upper limit value to be −0.093.

For conditional expression (8), it is preferable to let the lower limit value to be 2.1.

Moreover, for conditional expression (8), by providing an upper limit value of 5.0, and making an arrangement such that the upper limit value of 5.0 is not surpassed, it is possible to reduce the refractive power of the third lens unit or an amount of movement of the third lens unit, and it is advantageous for small-sizing.

Furthermore, for conditional expression (8), it is more preferable to let the upper limit value to be 3.0.

For conditional expression (9), it is preferable to let the lower limit value to be 0.55, and 0.58 is more preferable.

Moreover, for conditional expression (9), it is preferable to let the upper limit value to be 1.25, and 1.2 is more preferable.

For conditional expression (10), it is preferable to let the upper limit value to be 34 from a point of view of correction of the chromatic aberration.

Moreover, for conditional expression (10), by providing a lower limit value of 19.5, and making an arrangement such that the lower limit value of 19.5 is reached, it is advantageous for reducing cost of the positive lens.

For conditional expression (11), it is preferable to let the lower limit value to be 3.0.

Moreover, for conditional expression (11), an upper limit value of 8.0, more preferably 6.0, may be provided and an arrangement may be made such that the upper limit value provided is not surpassed. It is advantageous for shortening the overall length by securing the positive refractive power of the first lens unit.

For conditional expression (12), it is preferable to let the lower limit value to be −3.2, and −3.0 is more preferable.

For conditional expression (13), it is preferable to let the lower limit value to be −0.2.

Moreover, for conditional expression (13), it is preferable to let the upper limit value to be −0.145.

For conditional expression (14), it is preferable to let the lower limit value to be 3, and 3.5 is more preferable.

Moreover, for conditional expression (14), it is preferable to let the upper limit value to be 6, and 5 is more preferable.

For conditional expression (15), it is preferable to let the lower limit value to be −0.9.

Moreover, for conditional expression (15), it is preferable to let the upper limit value to be −0.05.

For conditional expression (16), it is preferable to let the lower limit value to be −1.0, and −0.92 is more preferable.

Moreover, for conditional expression (16), it is preferable to let the upper limit value to be −0.6, and −0.7 is more preferable.

For conditional expression (17), it is preferable to let the lower limit value to be −0.8.

Moreover, for conditional expression (17), it is preferable to let the upper limit value to be −0.6, and −0.7 is more preferable.

For conditional expression (18), it is preferable to let the lower limit value to be 1.7.

Moreover, for conditional expression (18), it is preferable to let the upper limit value to be 5, and 3.5 is more preferable.

For conditional expression (19), it is preferable to let the lower limit value to be 0.75, and 1.1 is more preferable.

Moreover, for conditional expression (19), it is preferable to let the upper limit value to be 1.45.

For conditional expression (20), by providing an upper limit value of 2.4, and making an arrangement such that the upper limit value of 2.4 is not surpassed, it is advantageous for cost reduction of the negative lens.

Exemplary embodiments based on the present invention will be described below. Each of the embodiments provides a zoom lens which has a wide angle of view at the wide angle end, which is fast, and which has favorable optical performance, by devising the abovementioned ideas while facilitating cost reduction.

Moreover, a zoom lens according to each embodiment can be used as a taking lens of a digital camera. The zoom lens according to each embodiment may also be used in a monitoring camera and a video camera.

Concretely, the zoom lens according to each embodiment is a compact zoom lens having a wide angle of view of about 80° at a wide angle end, a zoom ratio of not less than 7.4 times, an improved image forming performance, and facilitating slimming when a lens barrel is collapsed.

By mounting such a zoom lens in an image pickup apparatus, an image pickup apparatus which is capable of dealing with various photographic scenes without losing portability, and which has a favorable imaging performance while suppressing the cost is provided.

Embodiments described below are examples of a zoom lens of a digital camera, and an image pickup apparatus using the zoom lens. In embodiments from a first embodiment to a ninth embodiment, and a tenth embodiment, an effective image pickup area in a zoom range excluding an area near the wide angle end is rectangular and fixed. An arrangement is made such that, near the wide angle end, the effective image pickup area is let to have a barrel shape, and an image having a distortion corrected is generated upon an image of in the barrel-type effective image pickup area is converted to a rectangular shape by image processing.

Values corresponding to conditional expressions in each embodiment are values in a state when focused at an infinite object point. Total length is a length resulted by adding a back focus fb (in air) to an optical axial distance from a surface of incidence up to a surface of emergence of a lens. Back focus fb (in air) is indicated by an air conversion length.

The exemplary embodiments of the zoom lens and an image pickup apparatus according to the present invention will be described below in detail by referring to accompanying diagrams. However, the present invention is not restricted to the embodiments described below.

Figures 23A, 23B:
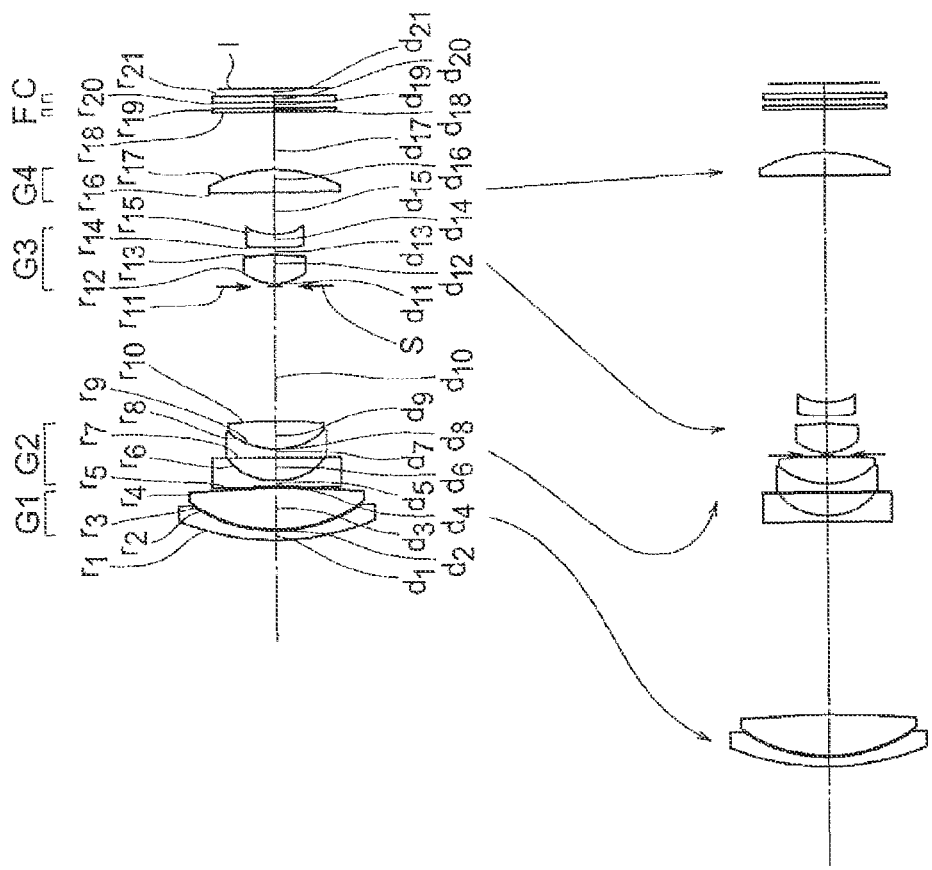
FIG. 23A and FIG. 23B are diagrams similar to FIG. 1A and FIG. 1B, of a zoom lens according to a tenth embodiment of the present invention.

Diagrams from FIG. 1A and FIG. 1B to FIG. 9A and FIG. 9B, and FIGS. 23A and 23B are lens cross-sectional views at the time of infinite object point focusing of zoom lenses according to the embodiments from the first embodiment to the ninth embodiment, and the tenth embodiment of the zoom lens according to the present invention where, FIG. 1A, FIG. 2A, . . . , FIG. 9A, and FIG. 23A show a state at a wide angle end, and FIG. 1B, FIG. 2B, . . . , FIG. 9B, and FIG. 23B show a state at a telephoto end, and are diagrams showing a movement of each lens unit from the wide angle end to the telephoto end.

Zoom lenses according to the first embodiment, from the third embodiment to the fifth embodiment, the seventh embodiment, the eighth embodiment, the ninth embodiment, and the tenth embodiment include in order from an object side to an image side, a first lens unit G1 having a positive refractive power, a second lens unit G2 having a negative refractive power, a third lens unit G3 having a positive refractive power, and a fourth lens unit G4 having a positive refractive power. Zoom lenses according to the second embodiment and the sixth embodiment include in order from an object side to an image side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

In all the embodiments, an aperture stop S is disposed immediately before the third lens unit G3, and at the time of zooming from the wide angle end to the telephoto end, the aperture stop S moves integrally with the third lens unit G3. A low-pass filter F on which an IR (infra-red rays) cut-off coating is applied and a cover glass C of a CCD (or a CMOS etc.) are disposed on an image side of the fourth lens unit G4 (on an image side of the fifth lens unit G5 in the second embodiment and the sixth embodiment). Moreover, an image plane I is formed on an image pickup surface of the CCD.

The aperture stop S has an aperture portion of which, an aperture size is variable, and F-number is variable.

The F-number in numerical examples which will be described later indicates minimum F-number in a variable range.

A structure of each lens unit in each embodiment will be described below.

The zoom lens according to the first embodiment is structured as shown in FIG. 1A and FIG. 1B, with numerical data which will be described later.

The first lens unit G1 includes in order from the object side, two single lenses namely, a negative meniscus lens having a convex surface directed toward the object side and a biconvex positive lens. Both the lenses are plastic lenses.

The second lens unit G2 includes in order from the object side, three single lenses namely, a biconcave negative lens, a negative meniscus lens having a convex surface directed toward the object side of which, an object-side surface is an aspheric surface, and a positive meniscus lens having a convex surface directed toward the object side of which, an image-side surface is an aspheric surface. The biconcave negative lens forms a front-side unit and the two lenses on the image side form a rear-side unit. The biconcave negative lens is a glass lens, and the two lenses on the image side are plastic lenses. Both an image-side surface of the negative meniscus lens and an object-side surface of the positive meniscus lens in the rear-side unit are spherical surfaces.

The third lens unit G3 includes in order from the object side, two single lenses namely, a biconvex positive lens of which, an object-side surface is an aspheric surface, and a negative meniscus lens having a convex surface directed toward the object side of which, an image-side surface is an aspheric surface. The biconvex positive lens is a glass lens, and the negative meniscus lens is a plastic lens.

The fourth lens unit G4 includes a positive meniscus lens having a convex surface directed toward the image side, and of which, an image-side surface is an aspheric surface. The positive meniscus lens is a plastic lens.

The zoom lens according to the second embodiment is structured as shown in FIG. 2A and FIG. 2B, with numerical data which will be described later.

The first lens unit G1 includes in order from the object side, two single lenses namely, a negative meniscus lens having a convex surface directed toward the object side of which, an object-side surface is an aspheric surface, and a biconvex positive lens of which, an image-side surface is an aspheric surface. Both the lenses are plastic lenses.

The second lens unit G2 includes in order from the object side, three single lenses namely, a biconcave negative lens, a biconcave negative lens of which, an object-side surface is an aspheric surface, and a biconvex positive lens of which, an image-side surface is an aspheric surface. The biconcave negative lens on the object side forms a front-side unit, and the two lenses on the image side form a rear-side unit. The biconcave negative lens on the object side is a glass lens, and the two lenses on the image side are plastic lenses. Both an image-side surface of the biconcave negative lens and an object-side surface of the biconvex positive lens in the rear-side unit are spherical surfaces.

The third lens unit G3 includes in order from the object side, a biconvex positive lens of which, an object-side surface and an image-side surface are aspheric surfaces, and a cemented lens of a negative meniscus lens having a convex surface directed toward the object side and a biconvex positive lens. All the lenses in the third lens unit G3 are glass lenses.

The fourth lens unit G4 includes a negative meniscus lens having a convex surface directed toward the object side. The negative meniscus lens is a plastic lens.

The fifth lens unit G5 includes a biconvex positive lens of which, an object-side surface and an image-side surface are aspheric surfaces. The biconvex positive lens is a plastic lens.

Figures 3A, 3B:
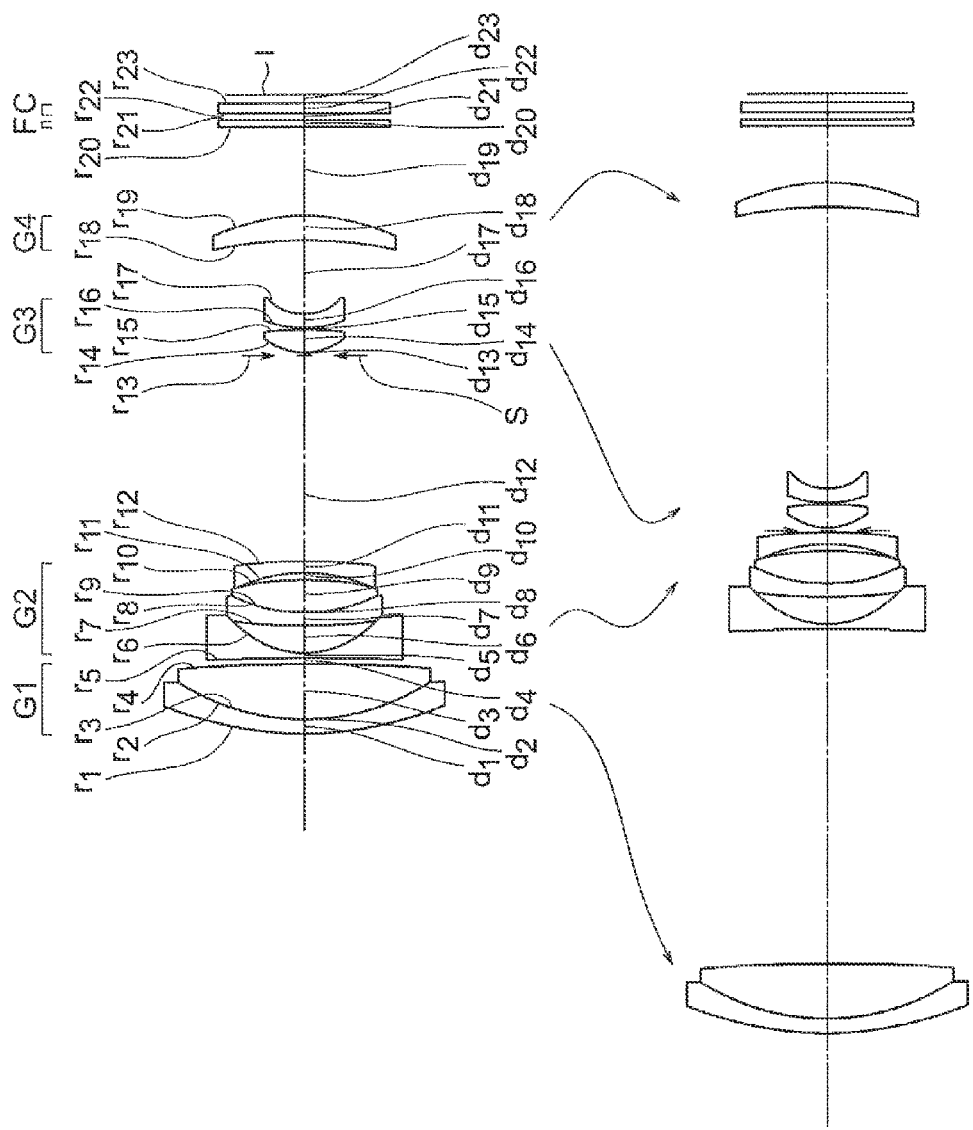
FIG. 3A and FIG. 3B are diagrams similar to FIG. 1A and FIG. 1B, of a zoom lens according to a third embodiment of the present invention.

The zoom lens according to the third embodiment is structured as shown in FIG. 3A and FIG. 3B, with numerical data which will be described later.

The first lens unit G1 includes in order from the object side, two single lenses namely, a negative meniscus lens having a convex surface directed toward the object side, and a biconvex positive lens of which, an image-side surface is an aspheric surface. Both the lenses are plastic lenses.

The second lens unit G2 includes in order from the object side, four single lenses namely, a biconcave negative lens, a negative meniscus lens having a convex surface directed toward the object side of which, an object-side surface is an aspheric surface, a biconvex positive lens of which, an image-side surface is an aspheric surface, and a negative meniscus lens having a convex surface directed toward the image side. The biconcave negative lens forms a front-side unit, and the three lenses on the image side form a rear-side unit. The biconcave negative lens in the front-side unit is a glass lens, and the three lenses on the image side are plastic lenses. Both an image-side surface of the negative meniscus lens having the convex surface directed toward the object side and an object-side surface of the biconvex positive lens in the rear-side unit are spherical surfaces.

An arrangement of lenses in the third lens unit G3 is same as the arrangement of lenses as described for the third lens unit G3 in the first embodiment.

An arrangement of lenses in the fourth lens unit G4 is same as the arrangement of lenses as described for the fourth lens unit G4 in the first embodiment.

The zoom lens according to the fourth embodiment is structured as shown in FIG. 4A and FIG. 4B, with numerical data which will be described later.

An arrangement of lenses in the first lens unit G1 is same as the arrangement of lenses as described for the first lens unit G1 in the third embodiment.

The second lens unit G2 includes in order from the object side, three single lenses namely, a biconcave negative lens, a positive meniscus lens having a convex surface directed toward an image side of which, an object-side surface and an image-side surface are aspheric surfaces, and a negative meniscus lens having a convex surface directed toward the image side of which, an image-side surface is an aspheric surface. The biconcave negative lens forms a front-side unit, and the two lenses on the image side form a rear-lens unit. The biconcave negative lens in the front-lens unit is a glass lens, and the two lenses on the image side are plastic lenses.

An arrangement of lenses in the third lens unit G3 is same as the arrangement of lenses as described for the third lens unit G3 in the first embodiment.

An arrangement of lenses in the fourth lens unit G4 is same as the arrangement of lenses as described for the fourth lens unit G4 in the first embodiment.

Figures 5A, 5B:
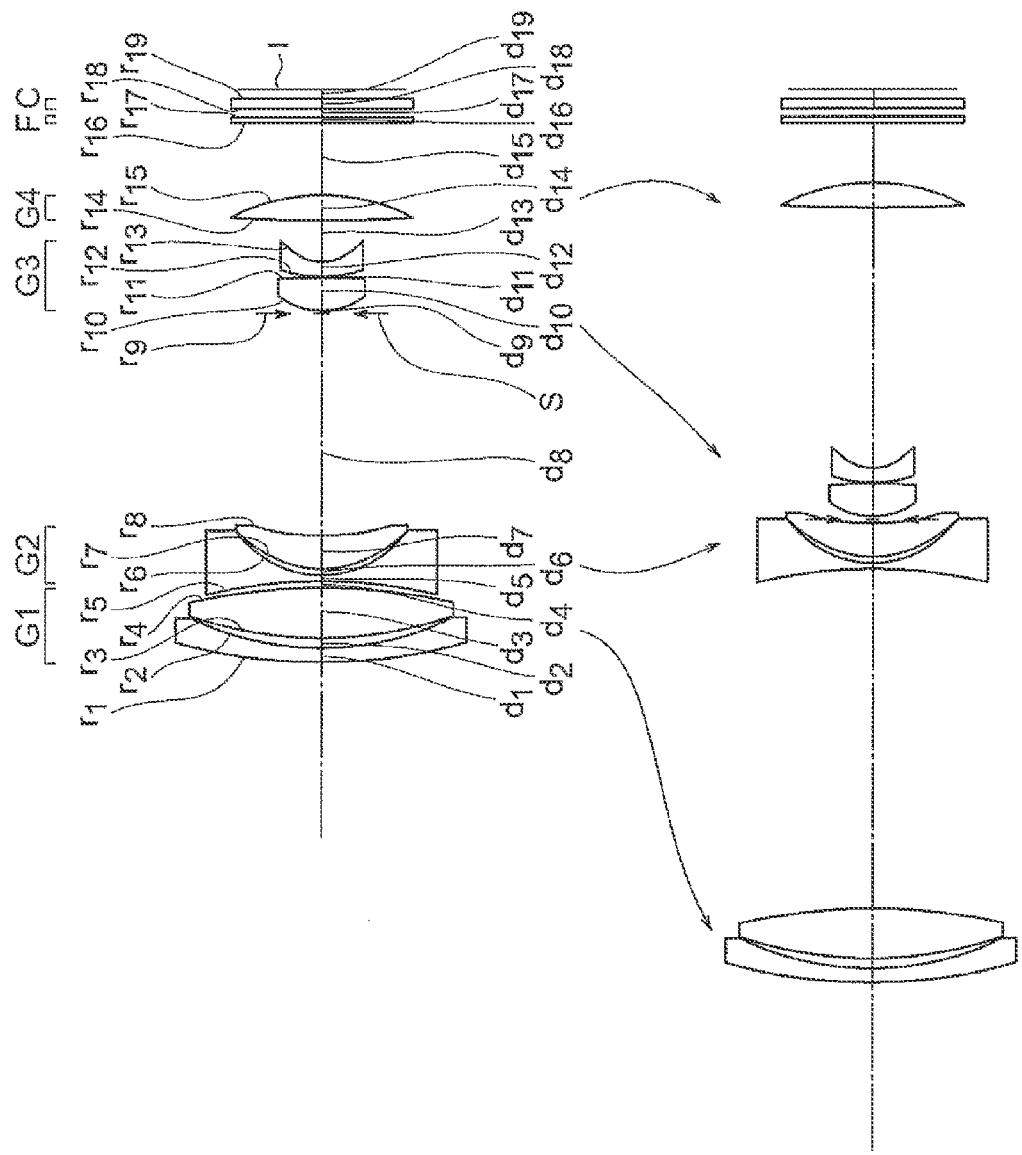
FIG. 5A and FIG. 5B are diagrams similar to FIG. 1A and FIG. 1B, of a zoom lens according to a fifth embodiment of the present invention.

The zoom lens according to the fifth embodiment is structured as shown in FIG. 5A and FIG. 5B, with numerical data which will be described later.

An arrangement of lenses in the first lens unit G1 is same as the arrangement of lenses as described for the first lens unit G1 in the third embodiment.

The second lens unit G2 includes in order from the object side, two single lenses namely, a biconcave negative lens and a positive meniscus lens having a convex surface directed toward the object side of which, an object-side surface and an image-side surface are aspheric surfaces. The biconcave negative lens is a glass lens, and the positive meniscus lens is a plastic lens.

An arrangement of lenses in the third lens unit G3 is same as the arrangement of lenses as described for the third lens unit G3 in the first embodiment.

The fourth lens unit G4 includes a biconvex positive lens of which, an image-side surface is an aspheric surface. The biconvex positive lens is a plastic lens.

The zoom lens according to the sixth embodiment is structured as shown in FIG. 6A and FIG. 6B, with numerical data which will be described later.

The first lens unit G1 includes in order from the object side, two single lenses namely, a negative meniscus lens having a convex surface directed toward the object side of which, an object-side surface and an image-side surface are aspheric surfaces, and a biconvex positive lens of which, an object-side surface and an image-side surface are aspheric surfaces. Both the lenses are plastic lenses.

The second lens unit G2 includes in order from the object side, three single lenses namely, a biconcave negative lens, a biconcave negative lens of which, an object-side surface and an image-side surface are aspheric surfaces, and a biconvex positive lens. The three single lenses in the second lens unit are glass lenses.

An arrangement of lenses in the third lens unit G3 is same as the arrangement of lenses as described for the third lens unit G3 in the second embodiment.

The fourth lens unit G4 includes a biconcave negative lens. The biconcave negative lens is a glass lens.

The fifth lens unit G5 includes a positive meniscus lens having a convex surface directed toward the image side of which, an object-side surface and an image-side surface are aspheric surfaces. The positive meniscus lens is a glass lens.

Figures 7A, 7B:
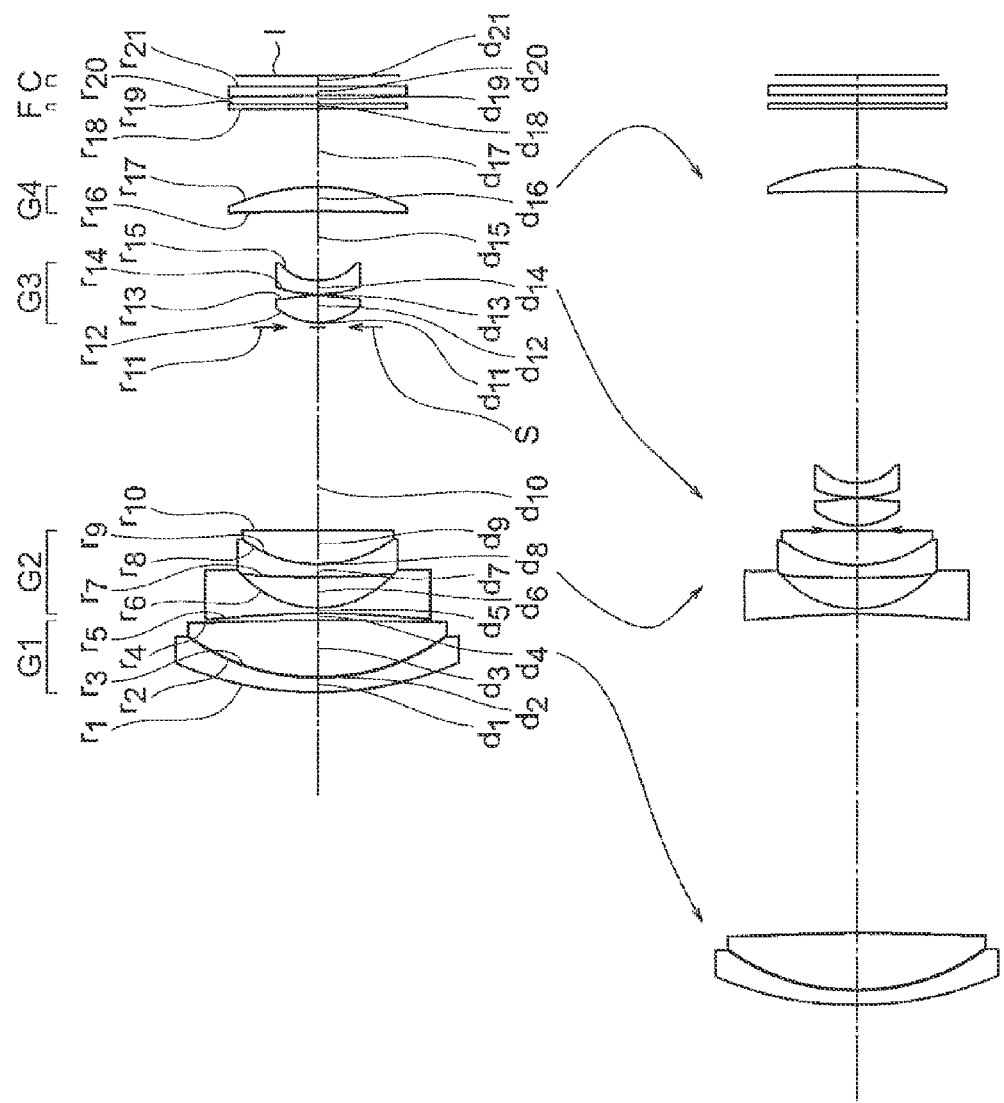
FIG. 7A and FIG. 7B are diagrams similar to FIG. 1A and FIG. 1B, of a zoom lens according to a seventh embodiment of the present invention.

The zoom lens according to the seventh embodiment is structured as shown in FIG. 7A and FIG. 7B, with numerical data which will be described later.

An arrangement of lenses in the first lens unit G1 is same as the arrangement of lenses as described for the first lens unit G1 in the first embodiment.

An arrangement of lenses in the second lens unit G2 is same as the arrangement of lenses as described for the second lens unit G2 in the first embodiment.

An arrangement of lenses in the third lens unit G3 is same as the arrangement of lenses as described for the third lens unit G3 in the first embodiment.

An arrangement of lenses in the fourth lens unit G4 is same as the arrangement of lenses as described for the fourth lens unit G4 in the first embodiment.

Figures 8A, 8B:
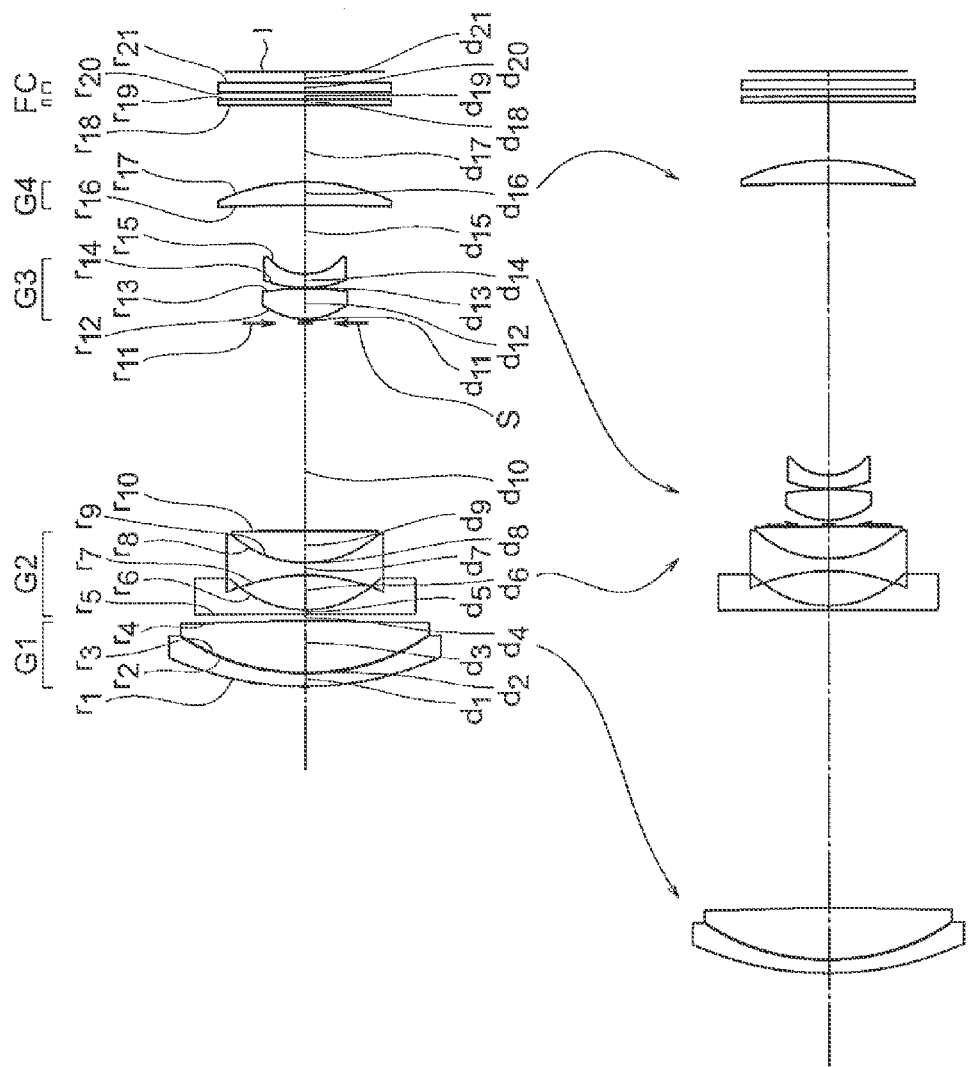
FIG. 8A and FIG. 8B are diagrams similar to FIG. 1A and FIG. 1B, of a zoom lens according to an eighth embodiment of the present invention.

The zoom lens according to the eighth embodiment is structured as shown in FIG. 8A and FIG. 8B, with numerical data which will be described later.

An arrangement of lenses in the first lens unit G1 is same as the arrangement of lenses as described for the first lens unit G1 in the first embodiment.

The second lens unit G2 includes in order from the object side to the image side, three single lenses namely, a negative meniscus lens having a convex surface directed toward the object side, a biconcave negative lens of which, an object-side surface is an aspheric surface, and a biconvex positive lens of which, an image-side surface is an aspheric surface. The negative meniscus lens forms a front-side unit, and the two lenses on the image side form a rear-side unit. The negative meniscus lens in the front-side unit is a glass lens, and the two lenses on the image side are plastic lenses. Both an image-side surface of the biconcave negative lens and an object-side surface of the biconvex positive lens in the rear-side unit are spherical surfaces.

An arrangement of lenses in the third lens unit G3 is same as the arrangement of lenses as described for the third lens unit G3 in the first embodiment.

An arrangement of lenses in the fourth lens unit G4 is same as the arrangement of lenses as described for the fourth lens unit G4 in the first embodiment.

The zoom lens according to the ninth embodiment is structured as shown in FIG. 9A and FIG. 9B, with numerical data which will be described later.

The first lens unit G1 includes in order from the object side, two single lenses namely, a negative meniscus lens having a convex surface directed toward the object side and a biconvex positive lens. Both the lenses are glass lenses.

An arrangement of lenses in the second lens unit G2 is same as the arrangement of lenses as described for the second lens unit G2 in the first embodiment.

An arrangement of lenses in the third lens unit G3 is same as the arrangement of lenses as described for the third lens unit G3 in the first embodiment.

An arrangement of lenses in the fourth lens unit G4 is same as the arrangement of lenses as described for the fourth lens unit G4 in the first embodiment.

The zoom lens according to the tenth embodiment is structured as shown in FIG. 23A and FIG. 23B, with numerical data which will be described later.

An arrangement of lenses in the first lens unit G1 is same as the arrangement of lenses as described for the first lens unit G1 in the third embodiment.

The second lens unit G2 includes in order from the object side, three single lenses namely, a biconcave negative lens, a biconcave negative lens of which, an object-side surface is an aspheric surface, and a biconvex positive lens of which, an image-side surface is an aspheric surface. The biconcave negative lens on the object side forms a front-side unit and the two lenses on the image side form a rear-side unit. The biconcave negative lens in the front-side unit is a glass lens, and the two lenses on the image side are plastic lenses. Both an image-side surface of the biconcave lens and an object-side surface of the biconvex lens in the rear-side unit are spherical surfaces.

The third lens unit G3 includes in order from the object side, two single lenses namely, a biconvex positive lens of which, an object-side surface and an image-side surface are aspheric surfaces, and a negative meniscus lens having a convex surface directed toward the object side of which, an image-side surface is an aspheric surface. The biconvex positive lens is a glass lens, and the negative meniscus lens is a plastic lens.

The fourth lens unit G4 includes a planoconvex positive lens having a convex surface directed toward the image side. The planoconvex positive lens is a plastic lens.

Movement of each lens unit from the wide angle end to the telephoto end in each embodiment is shown schematically in the diagrams from FIG. 1A and FIG. 1B to FIG. 9A and FIG. 9B and in diagrams FIG. 23A and FIG. 23B by arrows. Distances in detail between lens surfaces are shown in lens data of each embodiment.

The abovementioned movement of the lens units in the first embodiment will be described below.

The first lens unit G1 moves only toward the object side.

The second lens unit G2, after moving toward the image side, moves toward the object side, and again moves toward the image side, so as to be positioned on the object side at the telephoto end with respect to a position at the wide angle end.

The third lens unit G3 moves only toward the object side.

The fourth lens unit G4, after moving toward the image side, moves toward the object side, so as to be positioned on the image side at the telephoto end with respect to a position at the wide angle end.

Focusing from an infinite distance to a close distance is carried out by moving the fourth lens unit G4 toward the object side. Focusing in the embodiments from the third embodiment to the fifth embodiment, from the seventh embodiment to the ninth embodiment, and the tenth embodiment is carried out similarly as the focusing in the first embodiment.

The abovementioned movement of the lens units in the second embodiment will be described below.

The first lens unit G1, after moving toward the image side, moves toward the object side, so as to be positioned on the object side at the telephoto end with respect to a position at the wide angle end.

The second lens unit G2, after moving toward the image side, moves toward the object side, so as to be positioned on the image side at the telephoto end with respect to a position at the wide angle end.

The third lens unit G3 moves only toward the object side.

The fourth lens unit G4 moves only toward the object side while changing a distance from the third lens unit G3.

The fifth lens unit G5 moves only toward the image side.

Focusing from an infinite distance to a close distance is carried out by moving the fourth lens unit G4 toward the image side. Focusing in the sixth embodiment is carried out similarly as the focusing in the second embodiment.

The abovementioned movement of the lens units in the third embodiment will be described below.

The description for the movement of the first lens unit G1 and the fourth lens unit G4 is same as the description in the first embodiment.

The second lens unit G2, after moving toward the image side, moves toward the object side, and again moves toward the image side, so as to be positioned on the image side at the telephoto end with respect to a position at the wide angle end.

The third lens unit G3, after moving toward the object side, moves toward the image side, so as to be positioned on the object side at the telephoto end, with respect to a position at the wide angle end.

The abovementioned movement of the lens units in the fourth embodiment will be described below.

The description for the movement of the first lens unit G1, the second lens unit G2, and the third lens unit G3 is same as the description in the first embodiment.

The fourth lens unit G4 moves toward the image side, so as to be positioned on the image side at the telephoto end with respect to a position at the wide angle end.

The abovementioned movement of the lens units in the fifth embodiment will be described below.

The description for the movement of the first lens unit G1, the third lens unit G3, and the fourth lens unit G4 is same as the description in the first embodiment.

The second lens unit G2, after moving toward the object side, moves toward the image side, so as to be positioned on the image side at the telephoto end with respect to a position at the wide angle end.

The abovementioned movement of the lens units in the sixth embodiment will be described below.

The description for the movement of the first lens unit G1 is same as the description in the first embodiment.

The description for the movement of the second lens unit G2 is same as the description in the third embodiment.

The description for the movement of the third lens unit G3, the fourth lens unit G4, and the fifth lens unit G5 is same as the description in the second embodiment.

The abovementioned movement of the lens units in the seventh embodiment will be described below.

The description for the movement of the first lens unit G1, the third lens unit G3, and the fourth lens unit G4 is same as the description in the first embodiment.

The second lens unit G2, after moving toward the object side, moves toward the image side, so as to be positioned on the object side at the telephoto end with respect to a position at the wide angle end.

The abovementioned movement of the lens units in the eighth embodiment will be described below.

The description for the movement of the first lens unit G1, the third lens unit G3, and the fourth lens unit G4 is same as the description in the first embodiment.

The description for the movement of the second lens unit G2 is same as the description in the third embodiment.

The abovementioned movement of the lens units in the ninth embodiment will be described below.

The description for the movement of the first lens unit G1, the second lens unit G2, the third lens unit G3, and the fourth lens unit G4 is same as the description in the first embodiment.

The abovementioned movement of the lens units in the tenth embodiment will be described below.

The description for the movement of the first lens unit G1 is same as the description in the first embodiment.

The description for the movement of the second lens unit G2 is same as the description in the seventh embodiment.

The third lens unit G3 moves toward the object side and comes to rest, so as to be positioned on the object side at the telephoto end with respect to a position at the wide angle end.

The description for the movement of the fourth lens unit G4 is same as the description in the fourth embodiment.

Numerical data of each embodiment is shown below.

In the numerical data of each embodiment, r denotes radius of curvature of each lens surface, d denotes a lens thickness or a distance between two lenses, nd denotes a refractive index of each lens for a d-line, vd denotes an Abbe number for each lens for a d-line, K denotes a conical coefficient, A4, A6, A8, A10, and A12 denote aspherical surface coefficients of a fourth order, a sixth order, an eight order, a tenth order, and a twelfth order, and e±N indicates $10^{\pm N}$ respectively.

Using the aspherical surface coefficients of each embodiment, a shape of the aspheric surface is described by the following expression:

$$Z=(Y^2/r)/[1+\{1-(1+K)\cdot(Y/r)^2\}^{1/2}]+A4\times Y^4+A6\times Y^6+A8\times Y^8+A10\times Y^{10}+A12\times Y^{12}$$

where Z is let to be a coordinate of a direction along an optical axis, and Y is let to be a coordinate of a direction orthogonal to the optical axis.

In the zoom data, W denotes a wide angle end, T denotes a telephoto end. S1, S2 and S3, those are intermediate state in a process of change from the wide angle end to the telephoto end, denotes a first intermediate state (S1), a second intermediate state (S2) and a third intermediate state (S3) respectively.

Example 1

| Unit mm | | | | |
|---|---|---|---|---|
| Surface data | | | | |
| Surface no. | r | d | nd | vd |
| 1 | 16.468 | 0.70 | 1.63493 | 23.90 |
| 2 | 11.322 | 0.10 | | |
| 3 | 11.841 | 2.62 | 1.53071 | 55.69 |
| 4 | −244.182 | Variable | | |
| 5 | −147.785 | 0.29 | 1.78800 | 47.37 |
| 6 | 5.078 | 1.81 | | |
| 7* | 61.353 | 0.60 | 1.53071 | 55.69 |
| 8 | 6.130 | 0.10 | | |
| 9 | 6.415 | 1.67 | 1.63493 | 23.90 |
| 10* | 39.748 | Variable | | |
| 11 (stop) | ∞ | 0.20 | | |
| 12* | 3.336 | 1.32 | 1.58313 | 59.38 |
| 13 | −15.912 | 0.10 | | |
| 14 | 6.700 | 0.70 | 1.63493 | 23.90 |
| 15* | 2.712 | Variable | | |
| 16 | −119.290 | 1.25 | 1.53071 | 55.69 |
| 17* | −9.547 | Variable | | |
| 18 | ∞ | 0.30 | 1.51633 | 64.14 |
| 19 | ∞ | 0.40 | | |
| 20 | ∞ | 0.50 | 1.51633 | 64.14 |
| 21 | ∞ | 0.53 | | |
| Image plane (Image pickup surface) | ∞ | | | |

Aspherical surface data

7th surface

K = 0.000
A4 = −1.76559e−04, A6 = −2.73396e−06, A8 = 8.43045e−07
10th surface

K = 0.000
A4 = −6.62891e−04
12th surface

K = 0.000
A4 = −2.32754e−03, A6 = −2.99006e−04

15th surface

K = 0.000
A4 = 2.18060e−03
17th surface

K = 0.000
A4 = 6.17223e−04, A6 = −1.10727e−05

| Zoom data | | | | | |
|---|---|---|---|---|---|
| | W | S2 | T | S1 | S3 |
| Focal length | 4.51 | 12.39 | 33.72 | 7.90 | 20.51 |
| Fno. | 3.49 | 5.55 | 6.50 | 4.77 | 6.50 |
| Angle of view 2ω | 80.18 | 33.51 | 12.38 | 52.74 | 20.51 |
| d4 | 0.30 | 5.29 | 15.66 | 0.78 | 10.01 |
| d10 | 10.40 | 3.91 | 0.10 | 5.87 | 2.13 |
| d15 | 3.74 | 11.99 | 15.26 | 9.20 | 15.31 |
| d17 | 3.97 | 2.63 | 3.00 | 2.79 | 2.24 |
| fb (in air) | 5.38 | 4.05 | 4.40 | 4.26 | 3.66 |
| Lens total length (in air) | 31.27 | 36.70 | 46.88 | 31.57 | 42.56 |

| Unit focal length | | | |
|---|---|---|---|
| f1 = 33.79 | f2 = −6.48 | f3 = 8.44 | f4 = 19.48 |

Example 2

| Unit mm | | | | |
|---|---|---|---|---|
| Surface data | | | | |
| Surface no. | r | d | nd | vd |
| 1* | 24.410 | 0.80 | 1.63493 | 23.90 |
| 2 | 14.459 | 0.10 | | |
| 3 | 13.681 | 3.64 | 1.53071 | 55.69 |
| 4* | −65.212 | Variable | | |
| 5 | −84.556 | 0.40 | 1.83481 | 42.71 |
| 6 | 6.379 | 3.36 | | |
| 7* | −7.908 | 0.45 | 1.53071 | 55.69 |
| 8 | 20.528 | 0.17 | | |
| 9 | 13.407 | 2.07 | 1.63493 | 23.90 |
| 10* | −22.785 | Variable | | |
| 11 (stop) | ∞ | 0.66 | | |
| 12* | 6.354 | 2.08 | 1.58313 | 59.38 |
| 13* | −24.704 | 0.98 | | |
| 14 | 12.638 | 0.74 | 1.90366 | 31.32 |
| 15 | 4.379 | 2.68 | 1.48749 | 70.23 |
| 16 | −16.230 | Variable | | |
| 17 | 43.686 | 0.40 | 1.53071 | 55.69 |
| 18 | 4.437 | Variable | | |
| 19* | 149.868 | 2.43 | 1.53071 | 55.69 |
| 20* | −8.366 | Variable | | |
| 21 | ∞ | 0.30 | 1.51633 | 64.14 |
| 22 | ∞ | 0.40 | | |
| 23 | ∞ | 0.50 | 1.51633 | 64.14 |
| 24 | ∞ | 0.53 | | |
| Image plane (Image pickup surface) | ∞ | | | |

Aspherical surface data

1st surface

K = 0.000
A4 = 5.14602e−06, A6 = 1.48986e−08, A8 = 5.90757e−10
4th surface

K = 0.000
A4 = 2.55043e−05, A6 = 4.17894e−08, A8 = 5.25814e−10

-continued

Unit mm

7th surface

K = 0.000
A4 = 5.06184e−04, A6 = 4.68587e−07, A8 = 8.51029e−08
10th surface

K = 0.000
A4 = 2.25234e−04, A6 = −8.01083e−07
12th surface

K = 0.000
A4 = −4.07973e−04, A6 = 7.55715e−06, A8 = −1.35275e−06,
A10 = 5.42422e−08
13th surface K = 0.000
A4 = 3.31373e−04, A6 = 1.07658e−05, A8 = −1.59782e−06,
A10 = 7.28276e−08
19th surface K = 0.000
A4 = 1.30784e−04, A6 = 2.57915e−05
20th surface K = 0.000
A4 = 7.54269e−04, A6 = −4.16843e−06, A8 = 7.76650e−07,
A10 = −6.49906e−09

Zoom data

|  | W | S2 | T | S1 | S3 |
|---|---|---|---|---|---|
| Focal length | 4.55 | 16.94 | 69.79 | 8.43 | 35.65 |
| Fno. | 2.65 | 4.20 | 6.50 | 3.25 | 5.46 |
| Angle of view 2ω | 79.08 | 24.47 | 6.46 | 47.34 | 12.31 |
| d4 | 0.45 | 8.92 | 19.10 | 3.06 | 14.65 |
| d10 | 18.68 | 5.94 | 0.54 | 9.90 | 3.10 |
| d16 | 2.24 | 4.02 | 4.06 | 3.46 | 4.21 |
| d18 | 2.81 | 8.69 | 18.03 | 4.70 | 13.99 |
| d20 | 2.74 | 2.00 | 0.63 | 2.47 | 1.50 |
| fb (in air) | 4.20 | 3.49 | 2.09 | 3.93 | 3.02 |
| Lens total length (in air) | 49.34 | 52.03 | 64.79 | 46.01 | 59.94 |

Unit focal length f1 = 34.88   f2 = −6.54   f3 = 8.60   f4 = −9.34   f5 = 15.01

Example 3

Unit mm

Surface data

| Surface no. | r | d | nd | νd |
|---|---|---|---|---|
| 1 | 18.971 | 0.70 | 1.63493 | 23.90 |
| 2 | 11.959 | 0.10 | | |
| 3 | 11.881 | 2.85 | 1.53071 | 55.69 |
| 4* | −83.802 | Variable | | |
| 5 | −93.315 | 0.29 | 1.81600 | 46.62 |
| 6 | 5.084 | 1.45 | | |
| 7* | 56.604 | 0.60 | 1.53071 | 55.69 |
| 8 | 8.247 | 0.10 | | |
| 9 | 9.033 | 1.67 | 1.63493 | 23.90 |
| 10* | −22.619 | 0.40 | | |
| 11 | −8.466 | 0.60 | 1.53071 | 55.69 |
| 12 | 28.984 | Variable | | |
| 13 (stop) | ∞ | 0.20 | | |
| 14* | 3.376 | 1.20 | 1.58313 | 59.38 |
| 15 | −16.715 | 0.10 | | |
| 16 | 6.379 | 0.70 | 1.63493 | 23.90 |
| 17* | 2.743 | Variable | | |
| 18 | −21.669 | 1.25 | 1.53071 | 55.69 |

-continued

Unit mm

| 19* | −9.547 | Variable | | |
|---|---|---|---|---|
| 20 | ∞ | 0.30 | 1.51633 | 64.14 |
| 21 | ∞ | 0.40 | | |
| 22 | ∞ | 0.50 | 1.51633 | 64.14 |
| 23 | ∞ | 0.53 | | |
| Image plane (Image pickup surface) | ∞ | | | |

Aspherical surface data

4th surface

K = 0.000
A4 = 1.41593e−05
7th surface

K = 0.000
A4 = 3.55290e−04, A6 = −9.98484e−06, A8 = 1.33408e−06
10th surface

K = 0.000
A4 = −5.51128e−04
14th surface

K = 0.000
A4 = −2.23609e−03, A6 = −2.73722e−04
17th surface

K = 0.000, A4 = 2.11646e−03
19th surface

K = 0.000
A4 = 7.71253e−04, A6 = −1.66511e−05

Zoom data

|  | W | S2 | T | S1 | S3 |
|---|---|---|---|---|---|
| Focal length | 4.53 | 12.57 | 42.75 | 7.87 | 20.79 |
| Fno. | 3.90 | 6.04 | 6.86 | 5.15 | 6.99 |
| Angle of view 2ω | 80.15 | 32.57 | 9.69 | 52.43 | 19.94 |
| d4 | 0.30 | 5.52 | 17.50 | 1.09 | 10.27 |
| d12 | 10.79 | 4.24 | 0.10 | 6.13 | 2.71 |
| d17 | 3.89 | 11.80 | 14.80 | 8.65 | 15.31 |
| d19 | 4.60 | 3.50 | 3.00 | 3.90 | 2.64 |
| fb (in air) | 6.10 | 5.00 | 4.36 | 5.40 | 4.10 |
| Lens total length (in air) | 33.29 | 38.77 | 48.98 | 33.48 | 44.61 |

Unit focal length f1 = 32.04   f2 = −5.78   f3 = 8.36   f4 = 31.05

Example 4

Unit mm

Surface data

| Surface no. | r | d | nd | νd |
|---|---|---|---|---|
| 1 | 18.433 | 0.70 | 1.63493 | 23.90 |
| 2 | 12.212 | 0.10 | | |
| 3 | 12.511 | 2.60 | 1.53071 | 55.69 |
| 4* | −85.562 | Variable | | |
| 5 | −2720.642 | 0.29 | 1.72916 | 54.68 |
| 6 | 5.030 | 2.32 | | |
| 7* | −25.429 | 1.67 | 1.63493 | 23.90 |
| 8 | −7.702 | 0.40 | | |
| 9 | −7.025 | 0.60 | 1.53071 | 55.69 |
| 10* | −114.323 | Variable | | |
| 11 (stop) | ∞ | 0.20 | | |
| 12* | 3.390 | 1.21 | 1.58313 | 59.38 |
| 13 | −18.447 | 0.10 | | |

-continued

Unit mm

| | | | | |
|---|---|---|---|---|
| 14 | 5.929 | 0.70 | 1.63493 | 23.90 |
| 15* | 2.685 | Variable | | |
| 16 | −30.855 | 1.25 | 1.53071 | 55.69 |
| 17* | −9.547 | Variable | | |
| 18 | ∞ | 0.30 | 1.51633 | 64.14 |
| 19 | ∞ | 0.40 | | |
| 20 | ∞ | 0.50 | 1.51633 | 64.14 |
| 21 | ∞ | 0.53 | | |
| Image plane (Image pickup surface) | ∞ | | | |

Aspherical surface data

4th surface

K = 0.000
A4 = 9.03643e−06

7th surface

K = 0.000
A4 = −3.35623e−04

8th surface

K = 0.000
A4 = −1.99627e−04

10th surface

K = 0.000
A4 = −6.62016e−04

12th surface

K = 0.000
A4 = −2.20960e−03, A6 = −2.48285e−04

15th surface

K = 0.000
A4 = 1.86945e−03

17th surface

K = 0.000
A4 = 8.25458e−04, A6 = −1.54961e−05

Zoom data

| | W | S2 | T | S1 | S3 |
|---|---|---|---|---|---|
| Focal length | 4.65 | 12.37 | 34.61 | 7.90 | 20.49 |
| Fno. | 3.72 | 5.83 | 6.89 | 4.90 | 6.87 |
| Angle of view 2ω | 75.36 | 32.92 | 11.88 | 51.53 | 20.08 |
| d4 | 0.30 | 4.63 | 15.10 | 1.03 | 9.10 |
| d10 | 10.03 | 3.63 | 0.10 | 5.64 | 1.87 |
| d15 | 3.64 | 11.87 | 15.52 | 8.47 | 15.43 |
| d17 | 4.53 | 3.21 | 3.00 | 3.65 | 3.00 |
| fb (in air) | 5.99 | 4.65 | 4.31 | 5.10 | 4.29 |
| Lens total length (in air) | 32.10 | 36.93 | 47.18 | 32.38 | 42.83 |

Unit focal length

| f1 = 32.32 | f2 = −6.16 | f3 = 8.39 | f4 = 25.53 |
|---|---|---|---|

Example 5

Unit mm

Surface data

| Surface no. | r | d | nd | vd |
|---|---|---|---|---|
| 1 | 25.423 | 0.70 | 1.63493 | 23.90 |
| 2 | 14.552 | 0.50 | | |
| 3 | 19.178 | 2.52 | 1.53071 | 55.69 |
| 4* | −30.056 | Variable | | |
| 5 | −27.812 | 0.29 | 1.81600 | 46.62 |
| 6 | 5.063 | 0.35 | | |
| 7* | 5.199 | 1.67 | 1.63493 | 23.90 |

-continued

Unit mm

| | | | | |
|---|---|---|---|---|
| 8* | 10.660 | Variable | | |
| 9 (stop) | ∞ | 0.20 | | |
| 10* | 3.230 | 1.64 | 1.74320 | 49.34 |
| 11 | −57.125 | 0.10 | | |
| 12 | 7.462 | 0.70 | 1.63493 | 23.90 |
| 13* | 2.243 | Variable | | |
| 14 | 101.025 | 1.25 | 1.53071 | 55.69 |
| 15* | −9.547 | Variable | | |
| 16 | ∞ | 0.30 | 1.51633 | 64.14 |
| 17 | ∞ | 0.40 | | |
| 18 | ∞ | 0.50 | 1.51633 | 64.14 |
| 19 | ∞ | 0.53 | | |
| Image plane (Image pickup surface) | ∞ | | | |

Aspherical surface data

4th surface

K = 0.000
A4 = 2.98855e−06

7th surface

K = 0.000
A4 = −6.98711e−04

8th surface

K = 0.000
A4 = −1.09440e−03

10th surface

K = 0.000
A4 = −2.27388e−03, A6 = −2.85343e−04

13th surface

K = 0.000
A4 = 2.30922e−03

15th surface

K = 0.000
A4 = 1.67799e−04, A6 = −2.56969e−06

Zoom data

| | W | S2 | T | S1 | S3 |
|---|---|---|---|---|---|
| Focal length | 4.70 | 12.38 | 34.83 | 7.95 | 20.76 |
| Fno. | 3.26 | 5.39 | 6.40 | 4.53 | 5.79 |
| Angle of view 2ω | 75.74 | 33.25 | 11.94 | 52.27 | 19.49 |
| d4 | 0.30 | 5.27 | 16.91 | 1.31 | 12.09 |
| d8 | 11.07 | 5.35 | 0.10 | 7.73 | 2.70 |
| d13 | 2.03 | 10.37 | 13.02 | 7.73 | 11.22 |
| d15 | 3.62 | 1.00 | 3.00 | 1.43 | 2.23 |
| fb (in air) | 5.02 | 2.50 | 4.38 | 2.87 | 3.72 |
| Lens total length (in air) | 28.34 | 33.40 | 44.32 | 29.56 | 39.64 |

Unit focal length

| f1 = 37.32 | f2 = −7.82 | f3 = 7.89 | f4 = 16.50 |
|---|---|---|---|

Example 6

Unit mm

Surface data

| Surface no. | r | d | nd | vdp |
|---|---|---|---|---|
| 1* | 30.489 | 0.80 | 1.63493 | 23.90 |
| 2* | 17.947 | 0.10 | | |

-continued

Unit mm

| | | | | |
|---|---|---|---|---|
| 3* | 15.965 | 4.56 | 1.53071 | 55.69 |
| 4* | −116.876 | Variable | | |
| 5 | −53.423 | 0.40 | 2.00100 | 29.13 |
| 6 | 7.775 | 2.12 | | |
| 7* | −17.437 | 0.45 | 1.74156 | 49.21 |
| 8* | 13.577 | 0.24 | | |
| 9 | 19.039 | 1.74 | 1.94595 | 17.98 |
| 10 | −24.709 | Variable | | |
| 11 (stop) | ∞ | 0.66 | | |
| 12* | 7.080 | 1.79 | 1.58313 | 59.46 |
| 13* | −33.319 | 1.85 | | |
| 14 | 15.594 | 0.42 | 1.90366 | 31.32 |
| 15 | 4.936 | 2.31 | 1.48749 | 70.23 |
| 16 | −23.856 | Variable | | |
| 17 | −18.081 | 0.40 | 1.51633 | 64.14 |
| 18 | 14.576 | Variable | | |
| 19* | −48.755 | 2.63 | 1.49710 | 81.56 |
| 20* | −6.583 | Variable | | |
| 21 | ∞ | 0.30 | 1.51633 | 64.14 |
| 22 | ∞ | 0.40 | | |
| 23 | ∞ | 0.50 | 1.51633 | 64.14 |
| 24 | ∞ | 0.53 | | |
| Image plane (Image pickup surface) | ∞ | | | |

Aspherical surface data

1st surface

K = 0.000
A4 = −1.76886e−06, A6 = −2.84659e−08, A8 = −1.14276e−10
2nd surface

K = 0.000
A4 = −9.05659e−06, A6 = −1.64094e−08, A8 = −3.70506e−10
3rd surface

K = 0.000
A4 = −1.94692e−05, A6 = −3.45109e−08, A8 = −2.78300e−10
4th surface

K = 0.000
A4 = −1.45677e−07, A6 = −2.57375e−08, A8 = 1.49341e−10
7th surface

K = 0.000
A4 = 2.46752e−06, A6 = 2.17986e−06, A8 = −4.35955e−07,
A10 = 1.24562e−08
8th surface K = 0.000
A4 = −4.08369e−04, A6 = 5.75193e−06, A8 = −4.22156e−07,
A10 = 1.05142e−08
12th surface K = 0.000
A4 = −2.72668e−04, A6 = 1.40980e−05, A8 = −1.66601e−06,
A10 = 9.51924e−08
13th surface K = 0.000
A4 = 1.74113e−04, A6 = 1.29770e−05, A8 = −1.38695e−06,
A10 = 9.44365e−08
19th surface K = 0.000
A4 = −5.52657e−04
20th surface K = 0.000
A4 = 3.37676e−04, A6 = 8.27277e−07, A8 = 4.54351e−08,
A10 = 3.08370e−09

-continued

Unit mm

Zoom data

| | W | S2 | T | S1 | S3 |
|---|---|---|---|---|---|
| Focal length | 4.55 | 22.91 | 103.64 | 10.41 | 45.55 |
| Fno. | 2.83 | 4.61 | 7.22 | 3.56 | 5.42 |
| Angle of view 2ω | 81.54 | 17.76 | 4.28 | 38.86 | 9.16 |
| d4 | 0.22 | 15.49 | 27.48 | 7.18 | 22.75 |
| d10 | 20.43 | 5.72 | 0.54 | 9.88 | 3.57 |
| d16 | 1.50 | 8.38 | 9.46 | 5.34 | 9.13 |
| d18 | 2.54 | 7.01 | 15.63 | 3.21 | 10.56 |
| d20 | 7.20 | 6.28 | 1.04 | 7.09 | 4.96 |
| fb (in air) | 8.66 | 7.75 | 2.89 | 8.55 | 6.48 |
| Lens total length (in air) | 53.80 | 64.81 | 76.47 | 54.64 | 72.96 |

Unit focal length f1 = 43.47  f2 = −6.88  f3 = 10.72  f4 = −15.57  f5 = 15.00

Example 7

Unit mm

Surface data

| Surface no. | r | d | nd | νd |
|---|---|---|---|---|
| 1 | 17.785 | 0.70 | 1.60687 | 27.03 |
| 2 | 11.048 | 0.10 | | |
| 3 | 11.392 | 2.86 | 1.53071 | 55.69 |
| 4 | −147.050 | Variable | | |
| 5 | −74.842 | 0.29 | 1.78800 | 47.37 |
| 6 | 5.148 | 1.60 | | |
| 7* | 43.030 | 0.60 | 1.53071 | 55.69 |
| 8 | 6.135 | 0.10 | | |
| 9 | 6.367 | 1.67 | 1.63493 | 23.90 |
| 10* | 35.969 | Variable | | |
| 11 (stop) | ∞ | 0.20 | | |
| 12* | 3.262 | 1.38 | 1.58313 | 59.38 |
| 13 | −17.027 | 0.10 | | |
| 14 | 6.328 | 0.70 | 1.63493 | 23.90 |
| 15* | 2.607 | Variable | | |
| 16 | −139.578 | 1.25 | 1.53071 | 55.69 |
| 17* | −9.547 | Variable | | |
| 18 | ∞ | 0.30 | 1.51633 | 64.14 |
| 19 | ∞ | 0.40 | | |
| 20 | ∞ | 0.50 | 1.51633 | 64.14 |
| 21 | ∞ | 0.53 | | |
| Image plane (Image pickup surface) | ∞ | | | |

Aspherical surface data

7th surface

K = 0.000
A4 = −1.36646e−04, A6 = −1.19412e−07, A8 = 9.10502e−07
10th surface

K = 0.000
A4 = −6.64177e−04
12th surface

K = 0.000
A4 = −2.47291e−03, A6 = −3.21799e−04
15th surface

K = 0.000
A4 = 2.16273e−03

-continued

| Unit mm |
|---|

17th surface

K = 0.000
A4 = 6.25013e−04, A6 = −1.35133e−05

| Zoom data | | | | | |
|---|---|---|---|---|---|
|  | W | S2 | T | S1 | S3 |
| Focal length | 4.50 | 12.44 | 34.69 | 7.91 | 20.73 |
| Fno. | 3.46 | 5.59 | 6.43 | 4.79 | 6.55 |
| Angle of view 2ω | 80.10 | 33.48 | 12.02 | 52.86 | 20.38 |
| d4 | 0.30 | 5.27 | 16.17 | 0.73 | 10.21 |
| d10 | 10.34 | 4.09 | 0.10 | 6.04 | 2.34 |
| d15 | 3.52 | 12.10 | 14.84 | 9.29 | 15.35 |
| d17 | 3.90 | 2.24 | 3.00 | 2.47 | 1.73 |
| fb (in air) | 5.34 | 3.66 | 4.37 | 3.92 | 3.15 |
| Lens total length (in air) | 31.07 | 36.68 | 47.05 | 31.55 | 42.62 |

| Unit focal length | | | |
|---|---|---|---|
| f1 = 34.04 | f2 = −6.48 | f3 = 8.33 | f4 = 19.25 |

Example 8

| Unit mm |
|---|
| Surface data |

| Surface no. | r | d | nd | νd |
|---|---|---|---|---|
| 1 | 16.948 | 0.70 | 1.63493 | 23.90 |
| 2 | 11.663 | 0.10 | | |
| 3 | 12.324 | 2.60 | 1.53071 | 55.69 |
| 4 | −138.564 | Variable | | |
| 5 | 178.657 | 0.29 | 1.78800 | 47.37 |
| 6 | 5.474 | 1.83 | | |
| 7* | −8.986 | 0.60 | 1.53071 | 55.69 |
| 8 | 5.430 | 0.10 | | |
| 9 | 5.688 | 1.67 | 1.74000 | 32.00 |
| 10* | −84.774 | Variable | | |
| 11 (stop) | ∞ | 0.20 | | |
| 12* | 3.380 | 1.57 | 1.58313 | 59.38 |
| 13 | −19.167 | 0.10 | | |
| 14 | 6.080 | 0.70 | 1.63493 | 23.90 |
| 15* | 2.639 | Variable | | |
| 16 | −72.343 | 1.25 | 1.53071 | 55.69 |
| 17* | −9.547 | Variable | | |
| 18 | ∞ | 0.30 | 1.51633 | 64.14 |
| 19 | ∞ | 0.40 | | |
| 20 | ∞ | 0.50 | 1.51680 | 64.20 |
| 21 | ∞ | 0.53 | | |
| Image plane (Image pickup surface) | ∞ | | | |

| Aspherical surface data |
|---|

7th surface

K = 0.000
A4 = 3.05574e−04, A6 = 1.19830e−06, A8 = 5.55453e−08

10th surface

K = 0.000
A4 = 1.90557e−04

12th surface

K = 0.000
A4 = −2.26619e−03, A6 = −2.52093e−04

-continued

| Unit mm |
|---|

15th surface

K = 0.000
A4 = 1.79548e−03

17th surface

K = 0.000
A4 = 4.19312e−04, A6 = −8.28651e−06

| Zoom data | | | | | |
|---|---|---|---|---|---|
|  | W | S2 | T | S1 | S3 |
| Focal length | 4.54 | 12.45 | 34.61 | 7.98 | 20.54 |
| Fno. | 3.59 | 5.80 | 6.73 | 4.95 | 6.73 |
| Angle of view 2ω | 80.06 | 33.88 | 12.21 | 52.99 | 20.78 |
| d4 | 0.30 | 5.12 | 15.59 | 0.82 | 9.91 |
| d10 | 10.84 | 4.34 | 0.10 | 6.31 | 2.50 |
| d15 | 3.61 | 12.41 | 15.28 | 9.45 | 15.50 |
| d17 | 3.99 | 2.05 | 3.00 | 2.43 | 1.58 |
| fb (in air) | 5.47 | 3.45 | 4.37 | 3.95 | 2.99 |
| Lens total length (in air) | 31.94 | 37.03 | 47.04 | 32.23 | 42.61 |

| Unit focal length | | | |
|---|---|---|---|
| f1 = 33.40 | f2 = −6.56 | f3 = 8.57 | f4 = 20.58 |

Example 9

| Unit mm |
|---|
| Surface data |

| Surface no. | r | d | nd | νd |
|---|---|---|---|---|
| 1 | 15.541 | 0.70 | 1.68893 | 31.07 |
| 2 | 10.300 | 0.10 | | |
| 3 | 10.485 | 2.92 | 1.51633 | 64.14 |
| 4 | −169.159 | Variable | | |
| 5 | −95.893 | 0.29 | 1.78800 | 47.37 |
| 6 | 5.013 | 1.71 | | |
| 7* | 100.387 | 0.60 | 1.53071 | 55.69 |
| 8 | 5.919 | 0.10 | | |
| 9 | 6.185 | 1.67 | 1.63493 | 23.90 |
| 10* | 48.074 | Variable | | |
| 11 (stop) | ∞ | 0.20 | | |
| 12* | 3.330 | 1.34 | 1.58313 | 59.38 |
| 13 | −14.627 | 0.10 | | |
| 14 | 6.917 | 0.70 | 1.63493 | 23.90 |
| 15* | 2.732 | Variable | | |
| 16 | −60.284 | 1.25 | 1.53071 | 55.69 |
| 17* | −9.547 | Variable | | |
| 18 | ∞ | 0.30 | 1.51633 | 64.14 |
| 19 | ∞ | 0.40 | | |
| 20 | ∞ | 0.50 | 1.51680 | 64.20 |
| 21 | ∞ | 0.53 | | |
| Image plane (Image pickup surface) | ∞ | | | |

| Aspherical surface data |
|---|

7th surface

K = 0.000
A4 = −1.31725e−04, A6 = −4.10376e−06, A8 = 1.00540e−06

10th surface

K = 0.000
A4 = −6.48304e−04

-continued

| Unit mm |
|---|

12th surface

K = 0.000
A4 = −2.41763e−03, A6 = −3.10146e−04

15th surface

K = 0.000
A4 = 2.33359e−03

17th surface

K = 0.000
A4 = 6.56290e−04, A6 = −1.23770e−05

| Zoom data | | | | | |
|---|---|---|---|---|---|
| | W | S2 | T | S1 | S3 |
| Focal length | 4.49 | 12.54 | 34.72 | 7.91 | 20.80 |
| Fno. | 3.52 | 5.62 | 6.65 | 4.80 | 6.60 |
| Angle of view 2ω | 80.69 | 33.07 | 12.00 | 52.65 | 20.21 |
| d4 | 0.30 | 5.21 | 15.46 | 0.70 | 9.89 |
| d10 | 10.40 | 3.86 | 0.10 | 5.78 | 2.16 |
| d15 | 3.63 | 11.92 | 15.33 | 8.98 | 15.32 |
| d17 | 3.97 | 2.60 | 3.00 | 2.92 | 2.05 |
| fb (in air) | 5.42 | 4.02 | 4.42 | 4.35 | 3.47 |
| Lens total length (in air) | 31.44 | 36.70 | 46.99 | 31.49 | 42.52 |

| Unit focal length | | | |
|---|---|---|---|
| f1 = 33.38 | f2 = −6.31 | f3 = 8.29 | f4 = 21.19 |

Example 10

| Unit mm |
|---|
| Surface data |

| Surface no. | r | d | nd | vd |
|---|---|---|---|---|
| 1 | 19.807 | 0.70 | 1.63493 | 23.90 |
| 2 | 12.136 | 0.10 | | |
| 3 | 11.271 | 3.09 | 1.53071 | 55.69 |
| 4* | −54.902 | Variable | | |
| 5 | −55.233 | 0.31 | 1.88300 | 40.76 |
| 6 | 4.839 | 1.79 | | |
| 7* | −66.497 | 0.60 | 1.53071 | 55.69 |
| 8 | 5.281 | 0.10 | | |
| 9 | 5.539 | 1.94 | 1.63493 | 23.90 |
| 10* | −481687.590 | Variable | | |
| 11 (stop) | ∞ | 0.20 | | |
| 12* | 3.622 | 2.12 | 1.49700 | 81.54 |
| 13* | −13.066 | 0.60 | | |
| 14 | 16.552 | 0.96 | 1.63493 | 23.90 |
| 15* | 4.700 | Variable | | |
| 16 | ∞ | 1.70 | 1.53071 | 55.69 |
| 17* | −10.508 | Variable | | |
| 18 | ∞ | 0.30 | 1.51633 | 64.14 |
| 19 | ∞ | 0.40 | | |
| 20 | ∞ | 0.50 | 1.51680 | 64.20 |
| 21 | ∞ | 0.53 | | |
| Image plane (Image pickup surface) | ∞ | | | |

| Aspherical surface data |
|---|

4th surface

K = 0.000
A4 = 3.90378e−05, A6 = −1.82067e−08, A8 = 3.61899e−10

| Unit mm |
|---|

7th surface

K = 0.000
A4 = 4.29995e−04, A6 = 7.48907e−06, A8 = −2.97045e−07,
A10 = 6.27937e−08

10th surface

K = 0.000
A4 = −2.67417e−04, A6 = −1.50495e−05, A8 = −2.18746e−07

12th surface

K = 0.000
A4 = −1.16806e−03, A6 = −1.40856e−04, A8 = 1.17499e−05,
A10 = −1.39266e−06

13th surface

K = 0.000
A4 = 8.68950e−04, A6 = −6.64820e−05, A8 = 1.13168e−05

15th surface

K = 0.000
A4 = 3.48056e−03, A6 = 4.51107e−04, A8 = −1.44510e−05,
A10 = 1.00163e−05

17th surface

K = 0.000
A4 = 3.60700e−04, A6 = −2.40880e−05, A8 = 7.46200e−07,
A10 = −1.02300e−08

| Zoom data | | | | | |
|---|---|---|---|---|---|
| | W | S2 | T | S1 | S3 |
| Focal length | 4.35 | 12.80 | 41.75 | 7.23 | 22.64 |
| Fno. | 3.35 | 5.47 | 6.58 | 4.52 | 6.73 |
| Angle of view 2ω | 77.92 | 29.97 | 9.39 | 53.13 | 17.32 |
| d4 | 0.20 | 5.39 | 14.48 | 0.68 | 9.04 |
| d10 | 10.14 | 4.31 | 0.20 | 6.53 | 2.39 |
| d15 | 3.15 | 12.56 | 17.03 | 8.71 | 17.62 |
| d17 | 4.27 | 3.30 | 3.30 | 3.30 | 3.30 |
| fb (in air) | 12.33 | 19.88 | 24.57 | 16.08 | 24.96 |
| Lens total length (in air) | 35.18 | 42.09 | 51.76 | 35.80 | 48.91 |

| Lens total length | | | |
|---|---|---|---|
| f1 = 27.77 | f2 = −5.39 | f3 = 8.68 | f4 = 19.80 |

Zoom ratio in each embodiment will be indicated later as a value of each embodiment of conditional expression (1).

An image height in an effective image pickup area at the wide angle end (W), in a second intermediate state (S2), and at the telephoto end respectively is indicated in aberration diagram of each embodiment.

Letting the lens nearest to the object side in the zoom lens according to each embodiment to be L1, and the nth lens from the object side in the zoom lens according to each embodiment to be Ln, when a case of a glass lens is let to be G and a case of a plastic lens is let to be P, the table for the embodiments will be as follows.

|     | Example1 | Example2 | Example3 | Example4 | Example5 | Example6 |
| --- | --- | --- | --- | --- | --- | --- |
| L1  | P | P | P | P | P | P |
| L2  | P | P | p | P | P | P |
| L3  | G | G | G | G | G | G |
| L4  | P | P | P | P | P | G |
| L5  | P | P | P | P | G | G |
| L6  | G | G | P | G | P | G |
| L7  | P | G | G | P | P | G |
| L8  | P | G | P | P |   | G |
| L9  |   | P | P |   |   | G |
| L10 |   | P |   |   |   | G |

|     | Example7 | Example8 | Example9 | Example10 |
| --- | --- | --- | --- | --- |
| L1  | P | P | G | P |
| L2  | P | P | G | P |
| L3  | G | G | G | G |
| L4  | P | P | P | P |
| L5  | P | P | P | P |
| L6  | G | G | G | G |
| L7  | P | P | P | P |
| L8  | P | P | P | P |

A refractive index, Abbe number, a name of a material, and name of a manufacturer for a material of each lens described in each embodiment are shown below.

| Refractive index | Abbe number | Name of Material (Trademark) | Name of manufacturer (Trademark) |
| --- | --- | --- | --- |
| 1.63493 | 23.9 | EP5000 | Mitsubishi gas Chemical |
| 1.53071 | 55.69 | ZEO-E48R | Zeon |
| 1.60687 | 27.03 | OKP4 | Osaka gas Chemical |
| 1.74 | 32 | MR-174 | Mitsui Chemical |
| 1.788 | 47.37 | S-LAH64 | OHARA |
| 1.83481 | 42.71 | S-LAH55 | OHARA |
| 1.816 | 46.62 | S-LAH59 | OHARA |
| 1.72916 | 54.68 | S-LAL18 | OHARA |
| 2.001 | 29.13 | TAFD55 | HOYA |
| 1.58313 | 59.38 | S-BAL42 | OHARA |
| 1.7432 | 49.34 | S-LAM60 | OHARA |
| 1.94595 | 17.98 | FDS18 | HOYA |
| 1.90366 | 31.32 | TAFD25 | HOYA |
| 1.48749 | 70.23 | S-FSL5 | OHARA |
| 1.51633 | 64.14 | S-BSL7 | OHARA |
| 1.4971 | 81.56 | S-FPL51 | OHARA |
| 1.68893 | 31.07 | S-TIM28 | OHARA |

Aberration diagrams at the time of infinite object point focusing of the first embodiment are shown in FIG. 10A to FIG. 10L. In the aberration diagrams from FIG. 10A to FIG. 10L, FIG. 10A, FIG. 10B, FIG. 10C, and FIG. 10D are aberration diagrams at the wide angle end (W), FIG. 10E, FIG. 10F, FIG. 10G, and FIG. 10H are aberration diagrams in the second intermediate state (S2), and FIG. 10I, FIG. 10J, FIG. 10K, and FIG. 10L are aberration diagrams at the telephoto end (T). Moreover the aberration is of four types arranged in an order from a left side, spherical aberration (SA), astigmatism (AS), distortion (DT), and chromatic aberration of magnification (CC). The types and arrangement of aberrations is similar in aberration diagrams of the other embodiments.

Aberration diagrams at the time of infinite object point focusing of the second embodiment are shown in FIG. 11A to FIG. 11L. FIG. 11A, FIG. 11B, FIG. 11C, and FIG. 11D are aberration diagrams at the wide angle end (W), FIG. 11E, FIG. 11F, FIG. 11G, and FIG. 11H are aberration diagrams in the second intermediate state (S2), and FIG. 11I, FIG. 11J, FIG. 11K, and FIG. 11L are aberration diagrams at the telephoto end (T).

Aberration diagrams at the time of infinite object point focusing of the third embodiment are shown in FIG. 12A to FIG. 12L. FIG. 12A, FIG. 12B, FIG. 12C, and FIG. 12D are aberration diagrams at the wide angle end (W), FIG. 12E, FIG. 12F, FIG. 12G, and FIG. 12H are aberration diagrams in the second intermediate state (S2), and FIG. 12I, FIG. 12J, FIG. 12K, and FIG. 12L are aberration diagrams at the telephoto end (T).

Aberration diagrams at the time of infinite object point focusing of the fourth embodiment are shown in FIG. 13A to FIG. 13L. FIG. 13A, FIG. 13B, FIG. 13C, and FIG. 13D are aberration diagrams at the wide angle end (W), FIG. 13E, FIG. 13F, FIG. 13G, and FIG. 13H are aberration diagrams in the second intermediate state (S2), and FIG. 13I, FIG. 13J, FIG. 13K, and FIG. 13L are aberration diagrams at the telephoto end (T).

Aberration diagrams at the time of infinite object point focusing of the fifth embodiment are shown in FIG. 14A to FIG. 14L. FIG. 14A, FIG. 14B, FIG. 14C, and FIG. 14D are aberration diagrams at the wide angle end (W), FIG. 14E, FIG. 14F, FIG. 14G, and FIG. 14H are aberration diagrams in the second intermediate state (S2), and FIG. 14I, FIG. 14J, FIG. 14K, and FIG. 14L are aberration diagrams at the telephoto end (T).

Aberration diagrams at the time of infinite object point focusing of the sixth embodiment are shown in FIG. 15A to FIG. 15L. FIG. 15A, FIG. 15B, FIG. 15C, and FIG. 15D are aberration diagrams at the wide angle end (W), FIG. 15E, FIG. 15F, FIG. 15G, and FIG. 15H are aberration diagrams in the second intermediate state (S2), and FIG. 15I, FIG. 15J, FIG. 15K, and FIG. 15L are aberration diagrams at the telephoto end (T).

Aberration diagrams at the time of infinite object point focusing of the seventh embodiment are shown in FIG. 16A to FIG. 16L. FIG. 16A, FIG. 16B, FIG. 16C, and FIG. 16D are aberration diagrams at the wide angle end (W), FIG. 16E, FIG. 16F, FIG. 16G, and FIG. 16H are aberration diagrams in the second intermediate state (S2), and FIG. 16I, FIG. 16J, FIG. 16K, and FIG. 16L are aberration diagrams at the telephoto end (T).

Aberration diagrams at the time of infinite object point focusing of the eighth embodiment are shown in FIG. 17A to FIG. 17L. FIG. 17A, FIG. 17B, FIG. 17C, and FIG. 17D are aberration diagrams at the wide angle end (W), FIG. 17E, FIG. 17F, FIG. 17G, and FIG. 17H are aberration diagrams in the second intermediate state (S2), and FIG. 17I, FIG. 17J, FIG. 17K, and FIG. 17L are aberration diagrams at the telephoto end (T).

Aberration diagrams at the time of infinite object point focusing of the ninth embodiment are shown in FIG. 18A to FIG. 18L. FIG. 18A, FIG. 18B, FIG. 18C, and FIG. 18D are aberration diagrams at the wide angle end (W), FIG. 18E, FIG. 18F, FIG. 18G, and FIG. 18H are aberration diagrams in the second intermediate state (S2), and FIG. 18I, FIG. 18J, FIG. 18K, and FIG. 18L are aberration diagrams at the telephoto end (T).

Aberration diagrams at the time of infinite object point focusing of the tenth embodiment are shown in FIG. 23A to FIG. 23L. FIG. 23A, FIG. 23B, FIG. 23C, and FIG. 23D are aberration diagrams at the wide angle end (W), FIG. 23E, FIG. 23F, FIG. 23G, and FIG. 23H are aberration diagrams in the second intermediate state (S2), and FIG. 23I, FIG. 23J, FIG. 23K, and FIG. 23L are aberration diagrams at the telephoto end (T).

In each aberration diagram, 'IH' denotes an image height (unit mm) of the effective image pickup area.

Next, corresponding values of conditional expressions from conditional expression (1) to conditional expression (20) in the embodiments described above will be shown. Values having a large number of digits are rounded off to fourth decimal point. Values which are omitted are marked as - -.

|  | Ex. 1 | Ex. 2 | Ex. 3 | Ex. 4 |
| --- | --- | --- | --- | --- |
| Conditional expression (1) | 7.485 | 15.412 | 9.444 | 7.445 |
| Conditional expression (2) | 1.635 | 1.635 | 1.635 | 1.635 |
| Conditional expression (3) | 31.790 | 31.790 | 31.790 | 31.790 |
| Conditional expression (4) | 1.531 | 1.531 | 1.531 | 1.531 |
| Conditional expression (5A), (5B) | 1.635 | 1.635 | 1.635 | 1.635 |
| Conditional expression (6) | −0.153 | −0.200 | −0.181 | −0.094 |
| Conditional expression (7) | −0.153 | −0.200 | −0.181 | −0.094 |
| Conditional expression (8) | 2.658 | 2.186 | 2.571 | 2.442 |
| Conditional expression (9) | 1.009 | 0.595 | 0.962 | 0.675 |
| Conditional expression (10) | 23.9 | 23.9 | 23.9 | 23.9 |
| Conditional expression (11) | 4.402 | — | 4.022 | 4.141 |
| Conditional expression (12) | −3.075 | — | −2.650 | −2.826 |
| Conditional expression (13) | −0.164 | — | −0.151 | −0.153 |
| Conditional expression (14) | 5.401 | — | 4.411 | 4.926 |
| Conditional expression (15) | −0.874 | — | −0.631 | −0.646 |
| Conditional expression (16) | −0.908 | — | −0.752 | −0.745 |
| Conditional expression (17) | −0.653 | — | −0.664 | −0.690 |
| Conditional expression (18) | 2.360 | — | 2.509 | 2.656 |
| Conditional expression (19) | 1.230 | — | 1.230 | 1.260 |
| Conditional expression (20) | 1.635 | — | 1.635 | 1.635 |

|  | Ex. 5 | Ex. 6 | Ex. 7 | Ex. 8 |
| --- | --- | --- | --- | --- |
| Conditional expression (1) | 7.407 | 23.062 | 7.702 | 7.615 |
| Conditional expression (2) | 1.635 | 1.635 | 1.607 | 1.635 |
| Conditional expression (3) | 31.790 | 31.790 | 28.660 | 31.790 |
| Conditional expression (4) | — | 1.742 | 1.531 | 1.531 |
| Conditional expression (5A), (5B) | 1.635 | 1.946 | 1.635 | 1.740 |
| Conditional expression (6) | −0.181 | −0.366 | −0.181 | −0.153 |
| Conditional expression (7) | −0.181 | −0.055 | −0.153 | −0.048 |
| Conditional expression (8) | 2.878 | 2.500 | 2.636 | 2.664 |
| Conditional expression (9) | 1.180 | 0.477 | 0.965 | 1.000 |
| Conditional expression (10) | 23.9 | 17.98 | 23.9 | 32.000 |
| Conditional expression (11) | 5.396 | — | 4.163 | 4.242 |
| Conditional expression (12) | −4.688 | — | −3.183 | −2.982 |
| Conditional expression (13) | −0.277 | — | −0.176 | −0.183 |
| Conditional expression (14) | 3.677 | — | 4.280 | 5.414 |
| Conditional expression (15) | −0.084 | — | −0.784 | −0.782 |
| Conditional expression (16) | −0.221 | — | −0.856 | −0.837 |
| Conditional expression (17) | −0.893 | — | −0.678 | −0.700 |
| Conditional expression (18) | 1.860 | — | 2.402 | 2.534 |
| Conditional expression (19) | 1.440 | — | 1.25 | 1.28 |

|  | Ex. 9 | Ex. 10 |
| --- | --- | --- |
| Conditional expression (1) | 7.727 | 9.608 |
| Conditional expression (2) | 1.689 | 1.635 |
| Conditional expression (3) | 33.070 | 31.790 |
| Conditional expression (4) | 1.531 | 1.531 |
| Conditional expression (5A), (5B) | 1.635 | 1.635 |
| Conditional expression (6) | −0.099 | −0.248 |
| Conditional expression (7) | −0.153 | −0.248 |
| Conditional expression (8) | 2.746 | 2.698 |
| Conditional expression (9) | 1.038 | 1.243 |
| Conditional expression (10) | 23.9 | 23.9 |
| Conditional expression (11) | 4.020 | 3.007 |
| Conditional expression (12) | −3.067 | −1.989 |
| Conditional expression (13) | −0.162 | −0.184 |
| Conditional expression (14) | 4.930 | 4.164 |
| Conditional expression (15) | −0.832 | −0.470 |
| Conditional expression (16) | −0.883 | −0.659 |
| Conditional expression (17) | −0.629 | −0.566 |
| Conditional expression (18) | 2.306 | 1.793 |
| Conditional expression (19) | 1.21 | 0.77 |
| Conditional expression (20) | 1.635 | 1.635 |

Each embodiment may be let to have the following arrangement.

In the zoom lens according to each of the abovementioned embodiment, an image in which, a barrel-shaped distortion has occurred near the wide angle end is formed on a rectangular-shaped opto-electric (photoelectric) conversion surface (image pickup surface). Whereas, in a first intermediate state, a second intermediate state, and a third intermediate state, and at the telephoto end, the occurrence of distortion is suppressed. For correcting by image processing, the distortion which occurs near the wide angle end, an arrangement may be made such that the effective image pickup area is let to be barrel-shaped at the wide angle end and rectangular-shaped in the intermediate focal length state and at the telephoto end. In such case, the effective image pickup area which has been set in advance is subjected to image conversion by image processing, and converted to rectangular-shaped image information in which the distortion is reduced. Therefore, image height at the wide angle end becomes smaller than the image height in the first intermediate state, the second intermediate state, and the third intermediate state, and at the telephoto end.

Moreover, when such an arrangement is made, it is possible to make small an effective aperture of the first lens unit and the second lens unit, which is advantageous for small-sizing.

Moreover, it is preferable to have an image converter which converts an electric signal of an image captured by the zoom lens to an image signal in which, chromatic shift due to the chromatic aberration of magnification is corrected by image processing. By correcting the chromatic aberration of magnification of the zoom lens electrically, it is possible to achieve more favorable image.

The chromatic aberration of magnification varies according to a zoom state, a focusing state, and an aperture value, and for each lens position (the zoom state, the focusing state, and the aperture value), it is preferable to store an amount of shift of a first primary color, a second primary color, and a third primary color as correction data in a memory holding unit. By referring to the correction data according to the zoom position, it is possible to output a second primary color signal and a third primary color signal in which the shift of the second primary color and the third primary color with respect to the first primary color has been corrected.

Moreover, for cutting off unnecessary light such as ghost and flare, a flare aperture may be disposed arbitrarily apart from the aperture stop.

The flare aperture may be disposed at any location such as on the object side of the first lens unit, between the first lens unit and the second lens unit, between the third lens unit and the fourth lens unit, and between the lens unit nearest to the image side and the image plane.

An arrangement may be made to cut off flare rays by a frame member, or another member may be arranged. Or, a method such as sticking a seal, or painting, or printing directly on an optical system may be adopted. The shape may be any shape such as a circular shape, an elliptical shape, a rectangular shape, a polygonal shape, or a range surrounded by a function curve. Furthermore, not only the unnecessary light rays but also light beam of a coma flare around screen may be cut off.

The ghost and flare may be reduced by applying an antireflection coating to a cemented surface and a surface in contact with air of each lens. Multi-coating is desirable as it enables to reduce the ghost and flare effectively. It is possible to further reduce reflectivity (reflectance) and to control angular characteristics and spectral characteristics of reflectivity by combining appropriately a film thickness and a coat material of two or more layered film. Moreover, an infra-red cut-off coating may be applied to the lens surfaces and the cover glass.

(Digital Camera)

Figure 19:
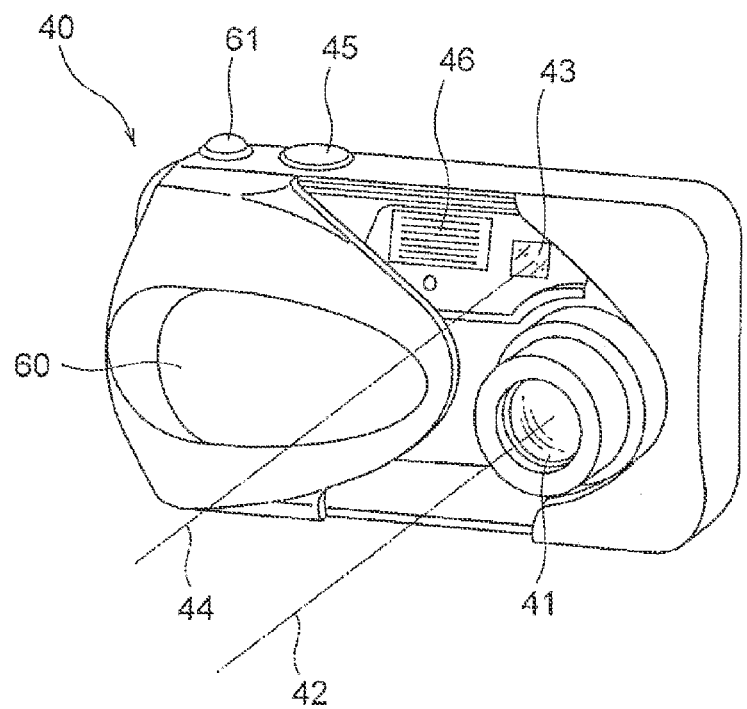
FIG. 19 is a front perspective view showing an appearance of a digital camera according to the present invention.
Figure 20:
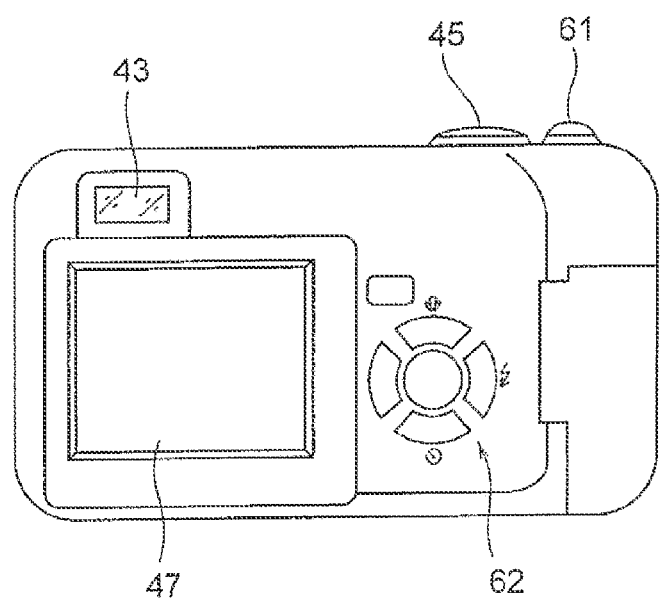
FIG. 20 is a rear view of the digital camera in FIG. 19.
Figure 21:
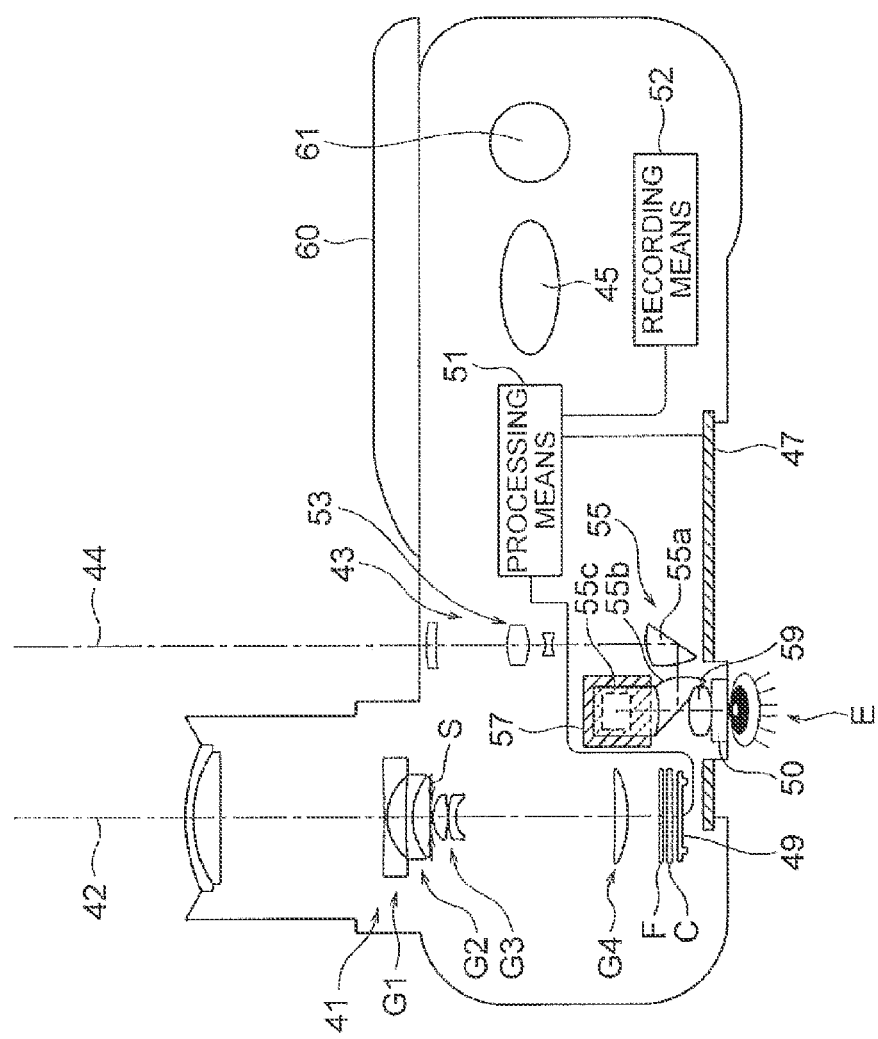
FIG. 21 is a partially transparent view of the digital camera in FIG. 19.

FIG. 19 to FIG. 22 are conceptual diagrams of a structure of a digital camera according to the present invention in which a zoom lens described above is incorporated in a taking optical system 41. FIG. 19 is a front perspective view showing an appearance of a digital camera 40, FIG. 20 is a rear view of the same, and FIG. 21 is a schematic cross-sectional view showing a structure of the digital camera 40. In FIG. 19 and FIG. 20, show an uncollapsed state of the taking optical system 41. The digital camera 40, in a case of this example, includes the taking optical system 41 having a taking optical path 42, a finder optical system 43 having a finder optical path 44, a shutter button 45, a flash 46, a liquid-crystal display monitor 47, a focal-length changing button 61, and a setting changing switch 62 etc., and in the collapsed state of the taking optical system 41, by sliding a cover 60, the taking optical system 41, the finder optical system 43, and the flash 46 are covered by the cover 60. Further, when the cover 60 is opened and the digital camera is set in a photo taking state, the taking optical system 41 assumes the uncollapsed state (photo-taking state at telephoto) as shown in FIG. 19, when the shutter button 45 disposed on an upper portion of the digital camera 40 is pressed, in synchronization with the pressing of the shutter button 45, a photograph is taken by the taking optical system 41 such as the zoom lens system in the first embodiment. An object image formed by the taking optical system 41 is formed on an image pickup surface of a CCD 49 via a cover glass C and a low pass filter F on which a wavelength region restricting coating is applied. An object image which is received as light by the CCD 49 is displayed on the liquid-crystal display monitor 47 which is provided on a rear surface of the digital camera 40 as an electronic image, via a processing means 51. Moreover, a recording means 52 is connected to the processing means 51, and it is also possible to record the electronic image which is taken. The recording means 52 may be provided separately from the processing means 51, or may be formed by recording by writing electronically in a flexible disc, a memory card, or an MO etc. Moreover, the camera may be formed as a silver-salt camera in which a silver-salt film is disposed instead of the CCD 49.

Furthermore, a finder objective optical system 53 is disposed on the finder optical path 44. The finder objective optical system 53 consists of a plurality of lens units (three units in the diagram), and two prisms (55a, 55b), and is made of a zoom optical system in which a focal length changes in synchronization with a zoom lens system of the taking optical system 41. An object image formed by the finder objective optical system 53 is formed on a field frame 57 of an erecting prism 55 which is an image erecting member. On a rear side of the erecting prism 55, a prism (55c) is disposed and furthermore, an eyepiece optical system 59 which guides an erected image to a viewer's eyeball is disposed. A cover member 50 is disposed on an emergence side of the eyepiece optical system 59.

The digital camera 40 structured in such manner has the taking optical system 41, according to the present invention, which is advantageous for a cost reduction, and has a high zoom ratio and an extremely stable imaging performance. Therefore, it is possible to realize the high performance.

(Internal Circuit Structure)

Figure 22:
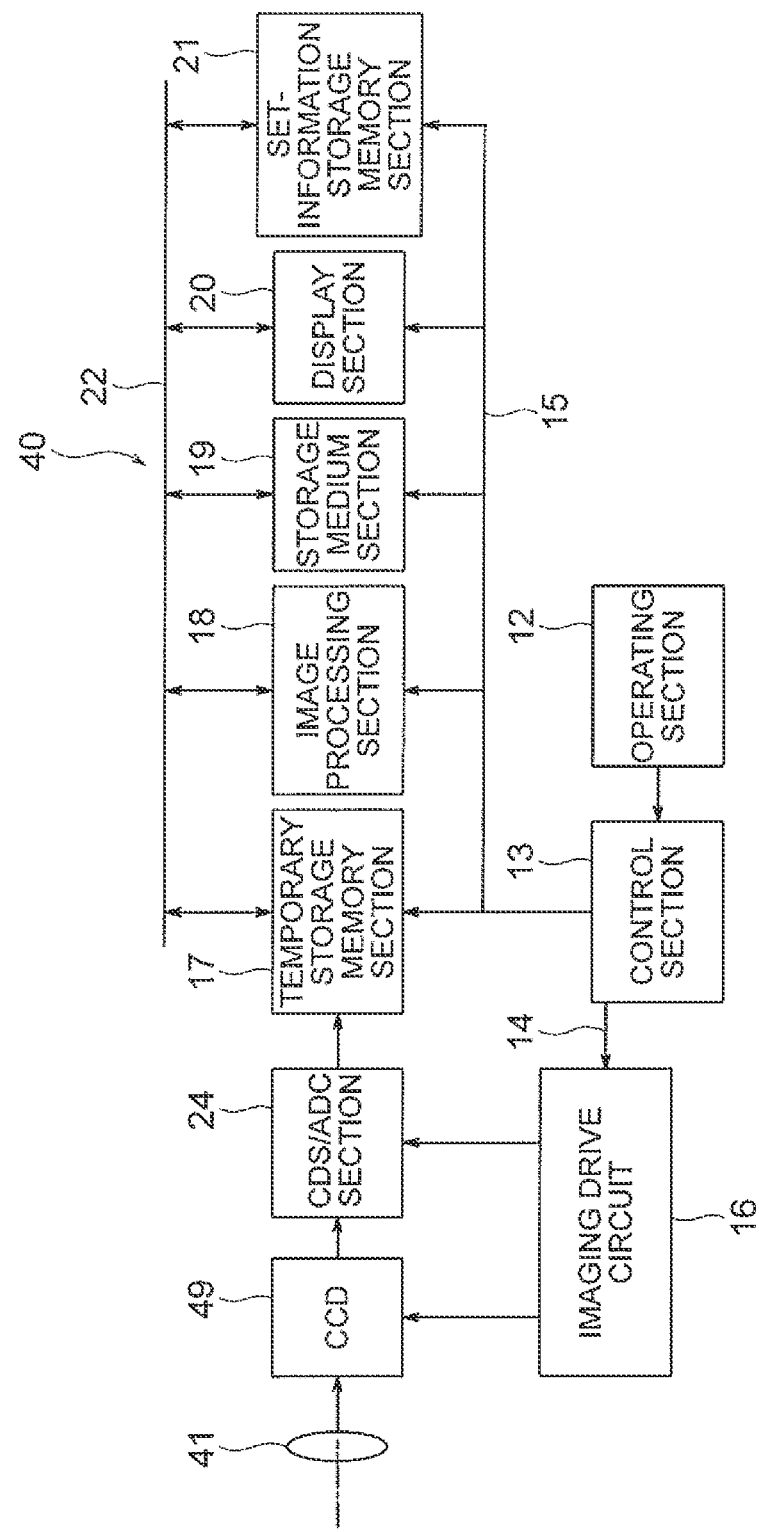
FIG. 22 is a structural block diagram of an internal circuit of main sections of the digital camera in FIG. 19.

FIG. 22 is a structural block diagram of an internal circuit of main components of the digital camera 40. In the following description, the processing means 51 described above includes for instance, a CDS/ADC section 24, a temporary storage memory 17, and an image processing section 18, and a storage means (recording means 52) consists of a storage medium section 19 for example.

As shown in FIG. 22, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and is a circuit which informs the control section, event information which is input from outside (by a user of the digital camera) via these input buttons and switches.

The control section 13 is a central processing unit (CPU), and has a built-in computer program memory which is not shown in the diagram. The control section 13 is a circuit which controls the entire digital camera 40 upon receiving instructions and commands input by the user of the camera via the operating section 12, according to a computer program stored in this computer program memory.

The CCD 49 receives as light an object image which is formed via the taking optical system 41 according to the present invention. The CCD 49 is an image pickup element which is driven and controlled by the imaging drive circuit 16, and which converts an amount of light for each pixel of the object image to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing (including the distortion correction and correction of the chromatic aberration of magnification), based on image-quality parameters specified by the control section 13.

The storage medium section 19 is a recording medium in the form of a card or a stick including a flash memory for instance, detachably mounted. The storage medium section 19 is a control circuit of a device in which, the RAW data transferred from the temporary storage memory 17 and image data subjected to image processing in the image processing section 18 are recorded and maintained in the card flash memory and the stick flash memory.

The display section 20 includes the liquid-crystal display monitor, and is a circuit which displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section. The set-information storage memory section 21 is a circuit which controls an input to and an output from the memories.

The digital camera 40 structured in such manner has the taking optical system 41, according to the present invention, which, while having a sufficient wide angle region, and a compact structure, has a high zoom ratio and an extremely stable imaging performance in the entire magnification region. Therefore, it is possible to realize fast, the high performance, the small size, and widening of the angle.

What is claimed is:

1. A zoom lens comprising in order from an object side to an image side:
   a first lens unit having a positive refractive power;
   a second lens unit having a negative refractive power;
   a third lens unit having a positive refractive power; and
   a fourth lens unit having a positive refractive power, wherein
   zooming from a wide angle end to a telephoto end is carried out by changing each distance between the lens units, and
   the zoom lens is a four-unit zoom lens, and
   the first lens unit comprises in order from the object side to the image side,
   a negative lens and a positive lens, and
   the total number of lenses in the first lens unit is two, and
   the third lens unit comprises,
   a positive lens component having a positive refractive power, which is a lens component positioned nearest to the object side in the third lens unit, and
   a negative lens component having a negative refractive power, which is a lens component positioned nearest to the image side in the third lens unit, and
   the positive lens component and the negative lens component form a lens block having only two surfaces which make a contact with air in an optical path, namely an object-side surface and an image-side surface, and
   the following conditional expressions (11), (12), and (13) are satisfied:

$$2.5 < f1p/f3p \quad (11)$$

$$-3.4 < f1 \times f2/f3^2 < -2.4 \quad (12)$$

$$-0.3 < h3f/f3 < -0.14 \quad (13)$$

where,
f1p denotes a focal length of the positive lens in the first lens unit,
f3p denotes a focal length of the positive lens component in the third lens unit,
f1 denotes a focal length of the first lens unit,
f2 denotes a focal length of the second lens unit,
f3 denotes a focal length of the third lens unit, and
h3f denotes an optical axial distance from a surface of incidence of the third lens unit up to a principal point of the third lens unit, and has a negative (minus) sign when the principal point is on the object side of the surface of incidence, and has a positive (plus) sign when the principal point is on the image side of the surface of incidence.

2. The zoom lens according to claim 1, wherein the following conditional expression (14) is satisfied:

$$2 < (R1obj + R1nimg)/(R1obj - R1nimg) < 7 \quad (14)$$

where,
R1obj denotes a paraxial radius of curvature of an object-side surface of the first lens unit, and
R1nimg denotes a paraxial radius of curvature of an image-side surface of the negative lens in the first lens unit.

3. The zoom lens according to claim 1, wherein the following conditional expression (15) is satisfied:

$$-1.0 < (R1obj + R1img)/(R1obj - R1img) < 0.0 \quad (15)$$

where,
R1obj denotes the paraxial radius of curvature of the object-side surface of the first lens unit, and
R1img denotes a paraxial radius of curvature of an image-side surface of the first lens unit.

4. The zoom lens according to claim 1, wherein the following conditional expression (16) is satisfied:

$$-1.1 < (R1pobj + R1img)/(R1pobj - R1img) < -0.5 \quad (16)$$

where,
R1pobj denotes a paraxial radius of curvature of an object-side surface of the positive lens in the first lens unit, and
R1img denotes the paraxial radius of curvature of an image-side surface of the first lens unit.

5. The zoom lens according to claim 1, wherein the following conditional expression (17) is satisfied:

$$-0.9 < (R3obj + R3pimg)/(R3obj - R3pimg) < -0.5 \quad (17)$$

where,
R3obj denotes a paraxial radius of curvature of an object-side surface of the third lens unit, and
R3pimg denotes a paraxial radius of curvature of an image-side surface of the positive lens component the lens unit.

6. The zoom lens according to claim 1, wherein the following conditional expression (18) is satisfied:

$$1.5 < (R3nobj + R3img)/(R3nobj - R3img) < 6 \quad (18)$$

where,
R3nobj denotes a paraxial radius of curvature of an object-side surface of the negative lens component in the third lens unit, and
R3img denotes the paraxial radius of curvature of the image-side surface of the third lens unit.

7. The zoom lens according to claim 1, wherein the object-side surface of the third lens unit is convex toward the object side, and the image-side surface of the third lens unit is concave toward the image side, and the following conditional expression (19) is satisfied:

$$0.7 < R3obj/R3img < 1.5 \quad (19)$$

where,
R3obj denotes the paraxial radius of curvature of the object-side surface of the third lens unit, and
R3img denotes the paraxial radius of curvature of the image-side surface of the third lens unit.

8. The zoom lens according to claim 1, wherein both the object-side surface and the image-side surface of the third lens unit are aspheric surfaces.

9. The zoom lens according to claim 1, wherein the negative lens component in the third lens unit is a negative lens, and the following conditional expression (20) is satisfied:

$$1.63 < n3n \quad (20)$$

where,
n3n denotes a refractive index with reference to a d-line of the negative lens in the third lens unit.

10. The zoom lens according to claim 1, wherein the total number of lens components in the third lens unit is two.

11. The zoom lens according to claim 1, wherein the total number of lenses in the third lens unit is two.

12. The zoom lens according to claim 1, wherein following conditional expression (2)

$$n1n < 1.7 \quad (2)$$

where,
n1n denotes a refractive index with reference to a d-line of the negative lens in the first lens unit.

13. The zoom lens according to claim 1, wherein the following conditional expression (3) is satisfied:

$$20 < |\nu n1 - \nu 1p| < 60 \quad (3)$$

where,
ν1n denotes Abbe number with reference to the d-line of the negative lens in the first lens unit,
ν1p denotes Abbe number with reference to the d-line of the positive lens in the first lens unit, and
ν1n<ν1p.

14. The zoom lens according to claim 1, wherein the following conditional expression (8) is satisfied:

$$2.0 < \beta 3t/\beta 3w \quad (8)$$

where,
β3t denotes a lateral magnification at the telephoto end of the third lens unit, and
β3w denotes a lateral magnification at the wide angle end of the third lens unit.

15. The zoom lens according to claim 1, wherein the following conditional expression (9) is satisfied:

$$0.5 < (\beta 3t/\beta 3w)/(\beta 2t/\beta 2w) < 1.3 \quad (9)$$

where,
β3t denotes the lateral magnification at the telephoto end of the third lens unit,
β3w denotes the lateral magnification at the telephoto end of the third lens unit,
β2t denotes a lateral magnification at the telephoto end of the second lens unit, and
β2w denotes a lateral magnification at the wide angle end of the second lens unit.

16. An image pickup apparatus comprising:
a zoom lens according to claim 1; and
an image pickup element which is disposed on an image side of the zoom lens, and which has an image pickup surface which picks up an image formed by the zoom lens, and which converts the image picked up to an electric signal.

\* \* \* \* \*